(12) United States Patent
Ehrlich

(10) Patent No.: US 12,405,750 B2
(45) Date of Patent: Sep. 2, 2025

(54) SHINGLED MAGNETIC RECORDING DRIVE WITH EFFICIENT SKIP-SEQUENTIAL WRITING

(71) Applicants: Kabushiki Kaisha Toshiba, Tokyo (JP); Toshiba Electronic Devices & Storage Corporation, Tokyo (JP)

(72) Inventor: Richard M. Ehrlich, Edina, MN (US)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/399,562

(22) Filed: Dec. 28, 2023

(65) Prior Publication Data

US 2025/0217075 A1 Jul. 3, 2025

(51) Int. Cl.
*G06F 3/06* (2006.01)
(52) U.S. Cl.
CPC ............ *G06F 3/0659* (2013.01); *G06F 3/061* (2013.01); *G06F 3/0676* (2013.01)
(58) Field of Classification Search
CPC ...... G06F 3/0659; G06F 3/061; G06F 3/0676; G06F 3/0613; G06F 3/064
See application file for complete search history.

(56) References Cited

U.S. PATENT DOCUMENTS

| | | | |
|---|---|---|---|
| 8,706,985 B1 | 4/2014 | Boyle | |
| 2017/0249969 A1* | 8/2017 | Aiello | G06F 3/0659 |
| 2017/0255556 A1* | 9/2017 | Peng | G06F 12/126 |
| 2019/0050327 A1* | 2/2019 | Li | G06F 3/0626 |
| 2019/0172490 A1* | 6/2019 | Cai | G06F 3/065 |
| 2019/0278710 A1 | 9/2019 | Ehrlich | |

* cited by examiner

*Primary Examiner* — Tracy A Warren
(74) *Attorney, Agent, or Firm* — Kim & Stewart LLP

(57) ABSTRACT

Non-sequential write commands in a shingled magnetic recording (SMR) drive are efficiently executed using a skip-bypass mode. When certain conditions are detected in the command history of the drive, the drive changes to the skip-bypass mode. In skip-bypass mode, data associated with the write commands are received into memory of the drive and written directly to a new SMR band in a sequential write operation, thereby bypassing storage in a media cache of the SMR drive. Prior to the sequential write operation, data associated with logical block addresses (LBAs) disposed between the LBAs referenced by the non-sequential write commands are read into the memory by a sequential read operation. The data associated with the non-sequential write commands can then be written, along with the data read in the sequential read operation, in a single sequential write operation to the new SMR band.

20 Claims, 12 Drawing Sheets

SHINGLED MAGNETIC RECORDING DRIVE WITH EFFICIENT SKIP-SEQUENTIAL WRITING

BACKGROUND

Magnetic hard disk drives (HDDs) have been employed in information technology as a low-cost means for providing random access to large quantities of data. Consequently, as digital technologies have greatly expanded the need for data storage in all aspects of modern life, areal density of information stored in HDDs has continuously increased. However, there is a physical limitation for the minimum width of a write head when using conventional data recording techniques, such as perpendicular magnetic recording (PMR). This minimum width has prevented further decreases in written track width and areal density of HDDs, even though the width of a read head can be further reduced.

A recently developed technology that has further increased the areal density of magnetic HDDs is shingled magnetic recording (SMR). In an HDD that employs SMR, adjacent data tracks on a magnetic disk are each written so as to overlap, and therefore overwrite, a portion of the previously written data track. As a result, the data tracks written in an SMR HDD are compressed in width to allow for increased data density in an HDD.

However, SMR HDDs have a significant drawback. Once a data track is written in a shingled structure, or "band," that data track cannot be updated in place as a random block write, because data in the adjacent and overlapping data tracks would be overwritten and either compromised or destroyed. Thus, random block writes cannot be performed on shingled data tracks without disturbing existing data in adjacent tracks. As a result, to overwrite data within a group of SMR tracks making up a band, the entire group of SMR tracks must be rewritten as a new SMR band in the HDD, which can cause significant write amplification and reduce drive performance. For example, to update a few megabytes (MB) of data that are stored in a 100-MB SMR band, the entire SMR band must be read, updated with the new data, then rewritten as a new SMR band. Updating a small amount of new data in this way results in significant write amplification, since the operations performed by the SMR drive include: seeking to the start of the original 100-MB SMR band; reading all tracks of the original 100-MB SMR band; seeking to a new location, such as a spare SMR band; updating the read data with the small amount of new data; and writing the entire 100-MB SMR band at the new location. In such an example, there can be significant latency associated with such a process, even though a relatively small amount of new data is ultimately stored in the SMR HDD.

To avoid such write amplification and latency issues, SMR HDDs typically include a media cache, which may include conventional data storage tracks, i.e., data storage tracks that are not written in an SMR format and instead are written in a conventional magnetic recording (CMR) format, and therefore are substantially non-overlapping. An SMR HDD employs the media cache to store random block writes without an entire band of shingled tracks being re-written for each write command received. These random block write commands can be flushed to an appropriate SMR band periodically and/or when a particular SMR band is determined to store an excessive quantity of invalid data. For example, the particular SMR band can be rewritten to include write data that are stored in the media cache and are associated with that SMR band. In this way, data associated with write commands can be stored more quickly by an SMR HDD and are written to appropriate SMR bands with less write amplification.

In some situations, the use of a media cache in an SMR HDD is ineffective at preventing write amplification and the associated latency. For instance, when the media cache of an SMR HDD has little remaining capacity and the SMR HDD receives non-sequential write commands that are scattered over a large number of SMR bands, performance of the SMR HDD can greatly decrease. This is because the SMR HDD is forced to continuously flush data from the media cache and re-write whole SMR bands, even in response to receiving a relatively small quantity of write data associated with each SMR band that is being re-written. For example, one pattern of access to an SMR HDD by a host that can cause such behavior occurs when the SMR HDD is part of a redundant array of independent disks (RAID). Specifically, when a host causes the parity bits stored on the SMR HDD to be rewritten, the host typically sends a series of commands that results in the SMR HDD reading all data being stored and over-writing the parity data portion of the stored data. In such a scenario, the media cache of the SMR HDD is quickly filled with the data associated with the many non-sequential write commands being received, and drive performance decreases significantly.

In light of the above, there is a need in the art for more efficient handling of a large number of non-sequential write commands in an SMR HDD.

SUMMARY

One or more embodiments provide systems and methods for efficiently executing a series of non-sequential write commands in an SMR HDD. When one or more conditions are detected in the command history of the SMR HDD, for example indicating a repeating pattern of host access, the SMR HDD changes to a continuous skip-bypass operational mode. In such a mode, the write commands are handled in a so-called "bypass mode," in which the data associated with the write commands is received into memory of the SMR HDD (such as DRAM) and written directly to a new SMR band, thereby bypassing storage in the media cache. To enable the writing of the non-sequential write-command data directly to an SMR band in this way, data associated with LBAs disposed between the LBAs referenced by the non-sequential write commands are read into the memory by a sequential read operation, where the sequential read operation spans an LBA range that includes two or more of the non-sequential write commands. The data associated with the non-sequential write commands can then be written, along with the data read in the sequential read operation, in a single sequential write operation to the new SMR band.

A magnetic disk drive, according to an embodiment, includes a shingled magnetic recording region (SMR) that includes a plurality of SMR bands, and a controller. The controller is configured to perform the steps of: determining that a series of multiple write commands spans a first logical block address (LBA) range associated with a first SMR band in the plurality of SMR bands, wherein the series of multiple write commands specifies a first range of contiguous LBAs and a second range of contiguous LBAs that is not contiguous with the first range of contiguous LBAs and includes first data associated with the first range of contiguous LBAs and second data associated with the second range of contiguous LBAs; in response to said determining, reading third data associated with one or more LBAs that are in between the first range of contiguous LBAs and the second range of contiguous LBAs; and writing, via a single sequential write operation, the first data associated with the first range of contiguous LBAs, the third data associated with said one or more LBAs, and the second data associated with the second range of contiguous LBAs.

A method of storing data in a magnetic disk drive with a shingled magnetic recording region (SMR) that includes a plurality of SMR bands, according to another embodiment, includes determining that a series of multiple write commands spans a first logical block address (LBA) range associated with a first SMR band in the plurality of SMR bands, wherein the series of multiple write commands specifies a first range of contiguous LBAs and a second range of contiguous LBAs that is not contiguous with the first range of contiguous LBAs and includes first data associated with the first range of contiguous LBAs and second data associated with the second range of contiguous LBAs; in response to said determining, reading third data associated with one or more LBAs that are in between the first range of contiguous LBAs and the second range of contiguous LBAs; and writing, via a single sequential write operation, the first data associated with the first range of contiguous LBAs, the third data associated with said one or more LBAs, and the second data associated with the second range of contiguous LBAs.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1A:
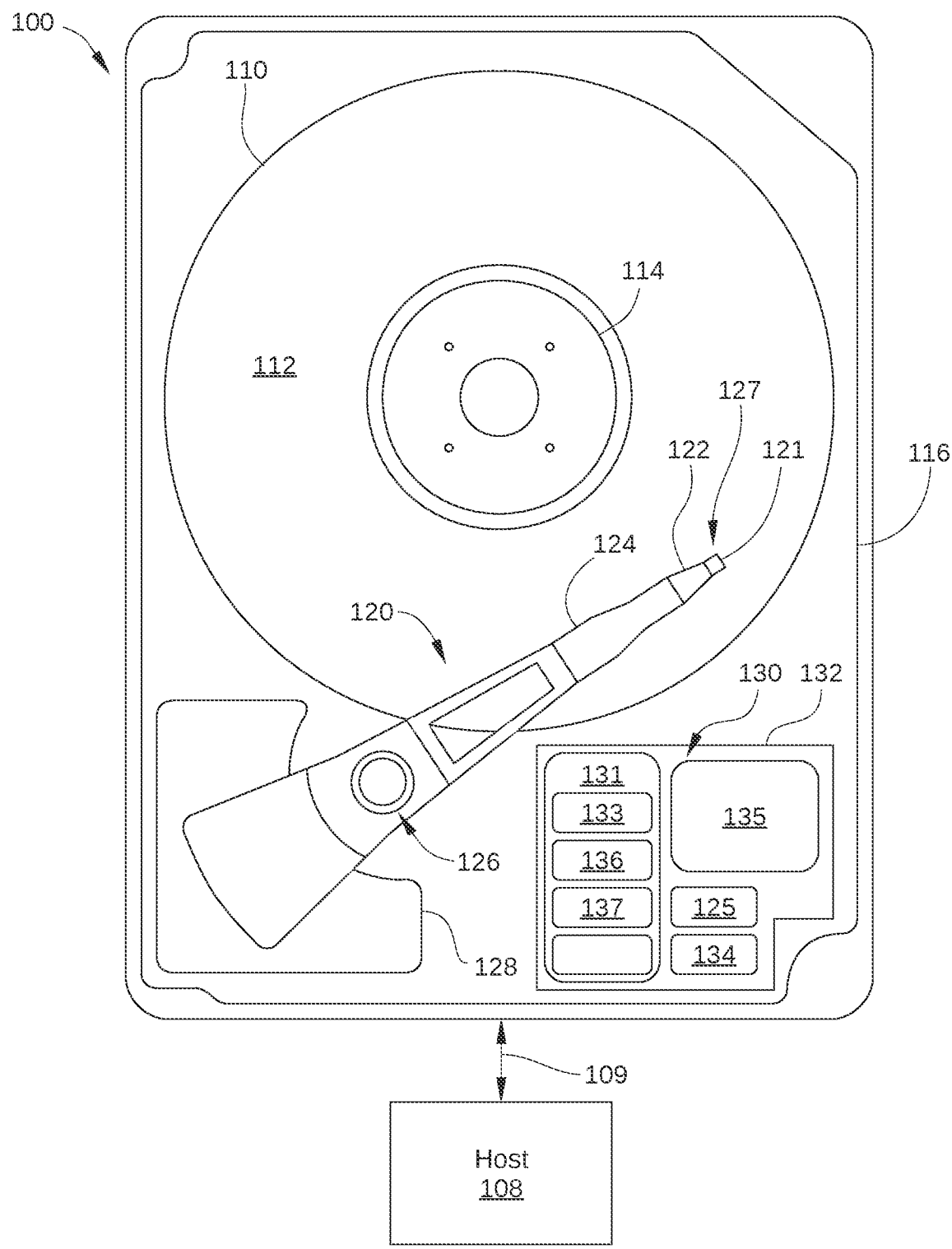
FIG. 1A is a schematic view of an exemplary hard disk drive, according to one embodiment.

FIG. 1A is a schematic view of an exemplary hard disk drive (HDD) 100, according to one embodiment. In the embodiment illustrated in FIG. 1A, HDD 100 is connected to a host 108, such as a host computer, via a host interface 109, such as a serial advanced technology attachment (SATA) bus or a Serial Attached Small Computer System Interface (SAS) bus.

For clarity, HDD 100 is illustrated without a top cover. HDD 100 includes multiple storage disks 110 (only one of which is visible in FIG. 1A) that each include one or two recording surfaces 112 on which a plurality of concentric data storage tracks are disposed. In FIG. 1A, only the top recording surface 112 of storage disk 110 is visible. The one or more storage disks 110 are coupled to and rotated by a spindle motor 114 that is mounted on a base plate 116. An actuator arm assembly 120 is also mounted on a base plate 116, and includes multiple sliders 121 (only one of which is visible in FIG. 1A), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126 by a voice coil motor (VCM) 128. Thus, VCM 128 moves all of the multiple sliders 121 radially relative to a respective recording surface 112 of a storage disk 110, thereby positioning read/write head 127 over a desired concentric data storage track. Spindle motor 114, read/write head 127, and VCM 128 are coupled to electronic circuits 130, which are mounted on a printed circuit board 132. In some embodiments, each read/write head 127 has an associated additional actuator, such as a microactuator. The additional actuator (not shown in FIG. 1) could be on the suspension (i.e., flexure arm 122), at the gimbal between the suspension and slider 121, or on slider 121, and can move the associated read/write head 127 radially a small distance. Such actuators are generally referred to as dual-stage actuators, and enable the servo system of HDD 100 to attain more accurate tracking control.

In the embodiment illustrated in FIG. 1A, a single actuator arm assembly 120 is shown that includes only one slider 121, one flexure arm 122, one actuator arm 124, and one read/write head 127. In other embodiments, actuator arm assembly 120 includes a plurality of actuator arms 124, sliders 121, flexure arms 122, and read/write heads 127, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 123, sliders 121, flexure arms 122, and read/write heads 127.

Electronic circuits 130 include a read/write channel 137, a microprocessor-based controller 133, random-access memory (RAM) 134 (which may be a dynamic RAM and used as one or more data buffers) and/or a flash memory device 135, and, in some embodiments, a flash manager device 136. In some embodiments, read/write channel 137 and microprocessor-based controller 133 are included in a single chip, such as a system-on-chip 131. In some embodiments, HDD 100 further includes a motor-driver chip 125 that accepts commands from microprocessor-based controller 133 and drives both spindle motor 114 and VCM 128. Read/write channel 137 communicates with the read/write head 127 via a preamplifier (not shown) that may be mounted on a flex-cable that is itself mounted on either base plate 116, actuator arm 120, or both.

Figure 1B:
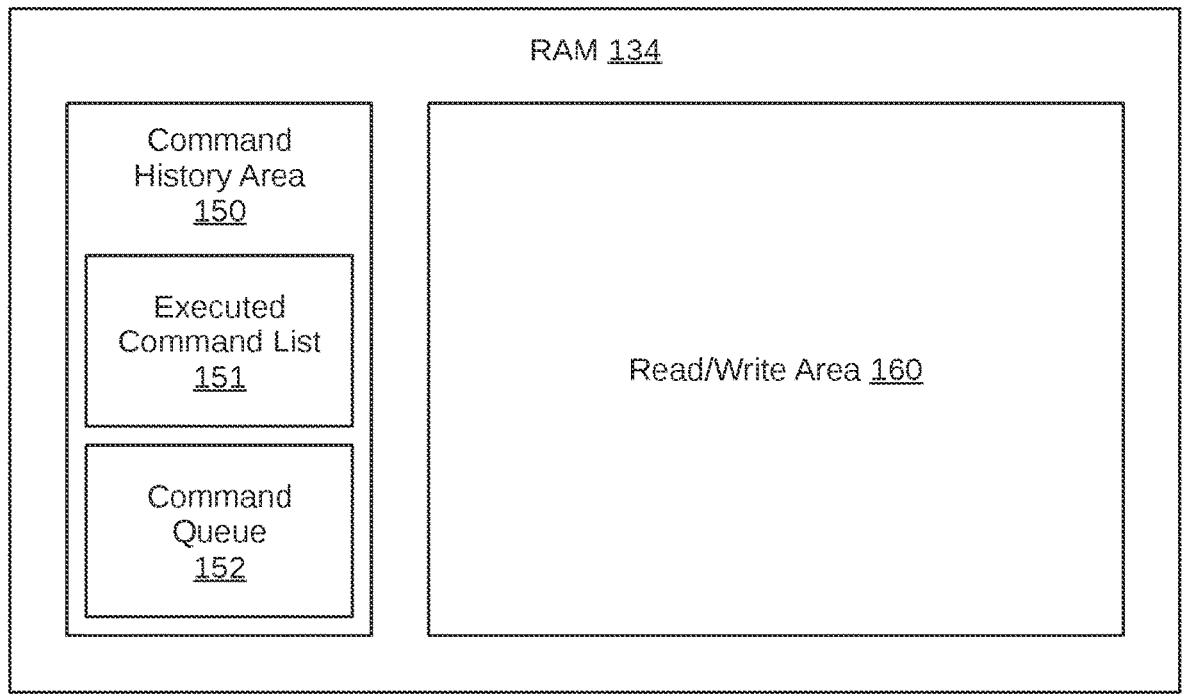
FIG. 1B is a schematic diagram of a random-access memory in the hard disk drive of FIG. 1A, according to various embodiments.

FIG. 1B is a schematic diagram of RAM 134, according to various embodiments. As shown, in some embodiments, RAM 134 includes a command history area 150 and a read/write area 160. Command history area 150 is a portion of RAM 134 for storing data associated with a command history of HDD 100 and includes an executed command list 151 and/or a command queue 152. Read/write area 160 is a portion of RAM 134 for storing data associated with read operations and write operations performed by HDD 100. In some embodiments, the physical locations of RAM 134 for storing data associated with command history area 150 and/or read/write area 160 can be statically allocated, and therefore remain constant during operation of HDD 100. Alternatively, in some embodiments, physical locations of RAM 134 for storing data associated with command history area 150 and/or read/write area 160 can be dynamically allocated, and therefore command history area 150 and/or read/write area 160 can change in size depending on the utilization of RAM 134.

Executed command list 151 stores metadata, records, and/or other information associated with the most recently executed disk access commands by HDD 100. For example, in some embodiments, executed command list 151 stores metadata and/or other information or records associated with the most recent 100, 500, or 1000 read and/or write commands. Alternatively or additionally, in some embodiments, executed command list 151 stores metadata and/or other information or records associated with disk access commands executed by HDD 100 during a specified time interval, such as the most recent five minutes, ten minutes, or hour. Generally, when a read or write command is executed by HDD 100, executed command list 151 is updated. In some embodiments, executed command list 151 is implemented as a circular buffer or other data structure that, once filled with entries, removes an oldest entry whenever a new entry is added.

In some embodiments, for a particular executed command, the metadata and/or other information or records stored by executed command list 151 include one or more of a range of LBAs associated with the executed command, an SMR band associated with the executed command, a quantity of write data associated with the executed command, and/or a time at which the executed command was executed by HDD 100.

Command queue 152 stores metadata, records, and/or other information associated with disk access commands that are received from a host but are not yet executed, such as the read and/or write commands. Thus, in such embodiments, when a read or write command is received by HDD 100, command queue 152 is updated. Generally, the number of disk access commands tracked by command queue 152 is based on the specific configuration of HDD 100 and the intended application for HDD 100.

Read/write area 160 temporarily stores data associated with read operations and write operations performed by HDD 100. In some embodiments, the read operations can include host-requested read operations and drive-initiated read operations, and the write operations can include host-requested write operations and drive-initiated write operations.

Read/write area 160 temporarily stores data associated with host-requested read operations when HDD 100 receives one or more read commands from a host, where the read command(s) indicate an LBA range (for example, associated with an SMR band) from which to read data. In such instances, when the requested data are read from the LBA range, HDD 100 temporarily stores the requested data in read/write area 160 at least until after the requested data are transmitted to the host. Read/write area 160 temporarily stores data associated with drive-initiated read operations when HDD 100 performs read operations that are not directly requested by a host. For example, when HDD 100 performs a read-modify-write operation on an existing SMR band to generate an updated version of the SMR band with new data, read/write area 160 temporarily stores data valid read from the existing SMR band at least until after the valid read data are written to the updated version of the SMR band.

In a similar vein, read/write area 160 temporarily stores data associated with host-requested write operations when HDD 100 receives one or more write commands from a host, where the write command(s) indicate an LBA range (for example, associated with user area 310) at which write data are to be written. In such instances, when the write command(s) are received from the host, HDD 100 temporarily stores the write data in read/write area 160 at least until after the requested data are written to the designated LBAs in user area 310 or in media-cache region 320. Read/write area 160 temporarily stores data associated with drive-initiated write operations when HDD 100 performs write operations that are not directly requested by a host. For example, when HDD 100 performs a read-modify-write operation on an existing SMR band to generate an updated version of the SMR band with new data, read/write area 160 temporarily stores data to be written to the updated version of the SMR band, such as appropriate data read from media cache or data read from the existing SMR band.

Returning to FIG. 1A, when data are transferred to or from a particular storage disk 110 of HDD 100, actuator arm assembly 120 moves in an arc between the inner diameter (ID) and the outer diameter (OD) of a particular storage disk 110. Actuator arm assembly 120 accelerates in one angular direction when current is passed in one direction through the voice coil of VCM 128 and accelerates in an opposite direction when such current is reversed, thereby allowing control of the position of actuator arm assembly 120 and the attached read/write head 127 with respect to the particular storage disk 110. VCM 128 is coupled with a servo system that uses the positioning data read from servo wedges on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of VCM 128, and drives said current using a current driver and associated circuitry. Typically, the appropriate current is determined based in part on a position feedback signal of the read/write head 127, such as a position error signal (PES). The PES is typically generated by using servo patterns included in the servo wedges (not shown) on the recording surface 112 as a reference. One embodiment of a recording surface 112 is illustrated in FIG. 2.

Figure 2:
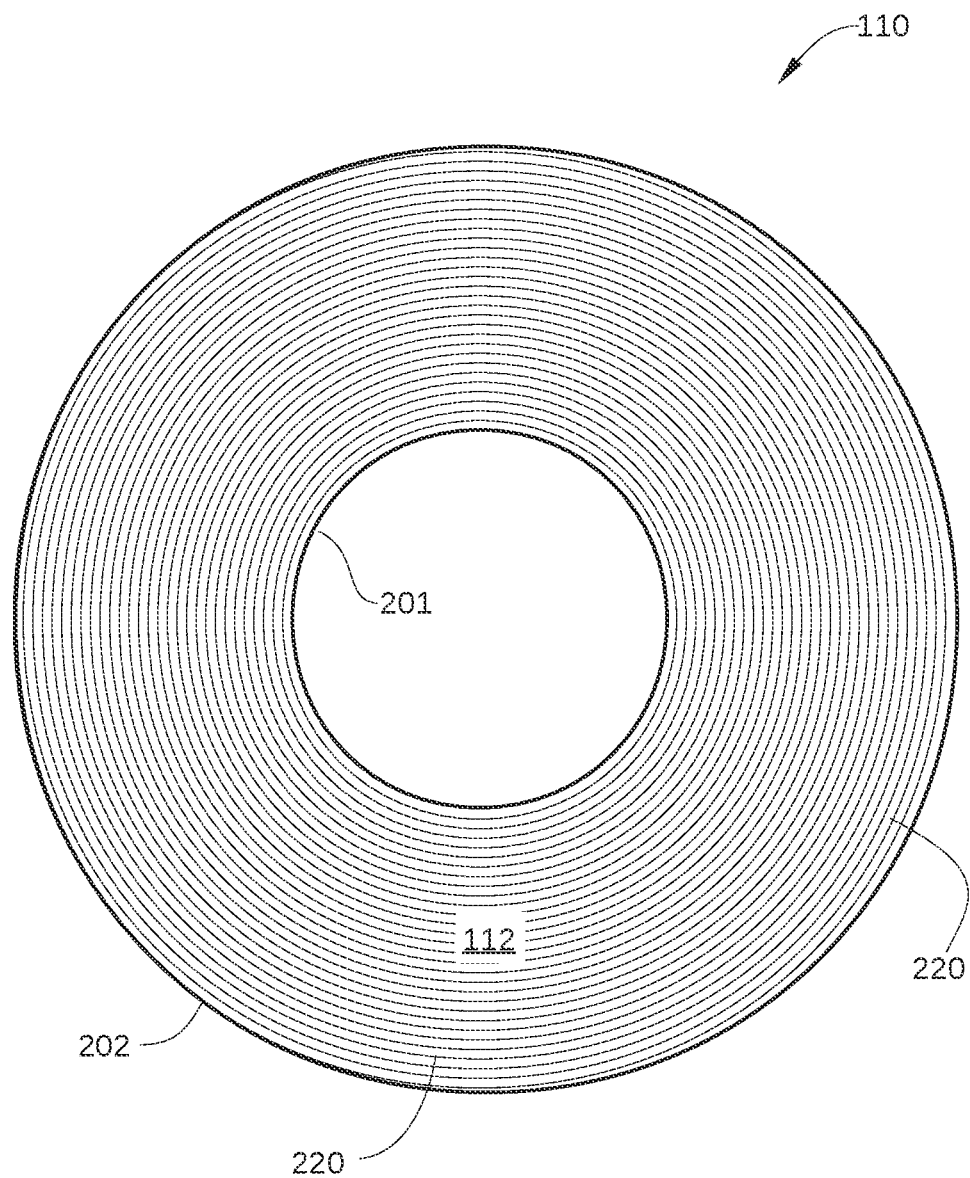
FIG. 2 schematically illustrates a recording surface of a storage disk with concentric data storage tracks formed thereon, according to an embodiment.
Figure 3:
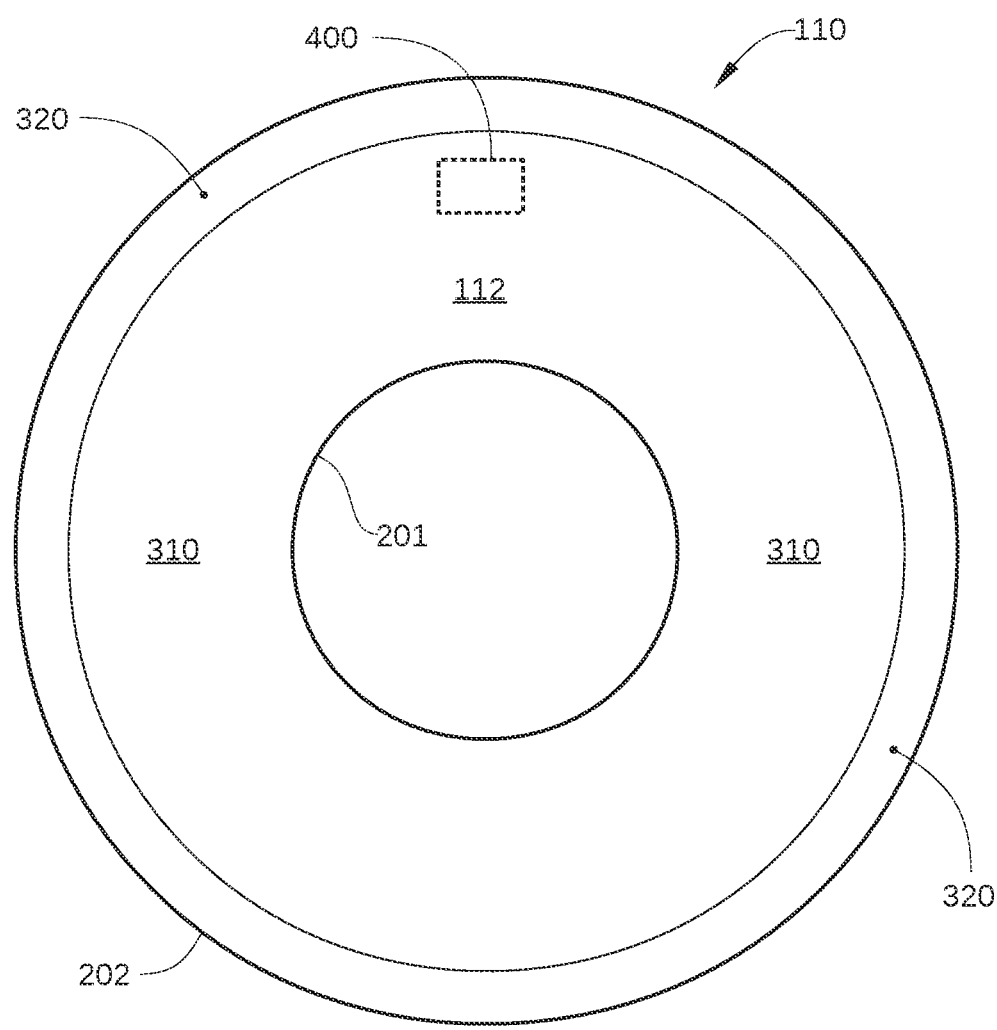
FIG. 3 schematically illustrates a user region of a recording surface and a media-cache region of the recording surface, according to an embodiment.

FIG. 2 schematically illustrates a recording surface 112 of a storage disk 110 with concentric data storage tracks 220 formed thereon, according to an embodiment. Data storage tracks 220 are formed on recording surface 112 between an ID 201 and an OD 202 of storage disk 110. Data storage tracks 220 are configured for storing data, and the radial position and track pitch, i.e., spacing, of data storage tracks 220 is defined by servo sectors (not shown) formed on recording surface 112. Each servo sector contains a reference signal that is read by read/write head 127 during read and write operations to position read/write head 127 above a desired data storage track 220. Typically, the actual number of data storage tracks 220 included on recording surface 112 is considerably larger than illustrated in FIG. 2. For example, recording surface 112 may include hundreds of thousands of concentric data storage tracks 220. The majority of data storage tracks 220 are disposed in a user region of recording surface 112, while the remainder of data storage tracks 220 are disposed in a media-cache region, as shown in FIG. 3. In some embodiments, recording surface 112 further includes a system area (not shown) for storage of drive-related data, such as code for HDD 100, data layout information, servo-control parameters, and/or the like.

FIG. 3 schematically illustrates a user region 310 of recording surface 112 and a media-cache region 320 of recording surface 112, according to an embodiment. For clarity, data storage tracks 220 formed on recording surface 112 are not shown in FIG. 3. In the embodiment illustrated in FIG. 3, media-cache region 320 is disposed proximate OD 202 of recording surface 112 and user region 310 includes the remainder of recording surface 112. In other embodiments, media-cache region 320 may be disposed in any other region of recording surface 112, for example in a region proximate ID 201, and/or in a middle diameter (MD) region of recording surface 112, or even distributed across a number of regions between the OD 202 and ID 201. Generally, user region 310 includes the majority of the storage capacity of recording surface 112.

User region 310 is a shingled magnetic recording (SMR) region of recording surface 112 that includes data storage tracks 220 that are arranged in groups, or "bands," of data storage tracks. Each band of data storage tracks is typically separated from adjacent bands by guard regions, which are inter-band gaps in which no data tracks are formed. Further, the data storage tracks formed in user region 310 are written in an SMR format, and therefore overlap adjacent data tracks in the same band. Thus, each band in user region 310 includes a plurality of overlapping data tracks that each have a width that is significantly narrower than a width of the write element included in read/write head 127. One embodiment of such a band is illustrated in FIG. 4.

Figure 4:
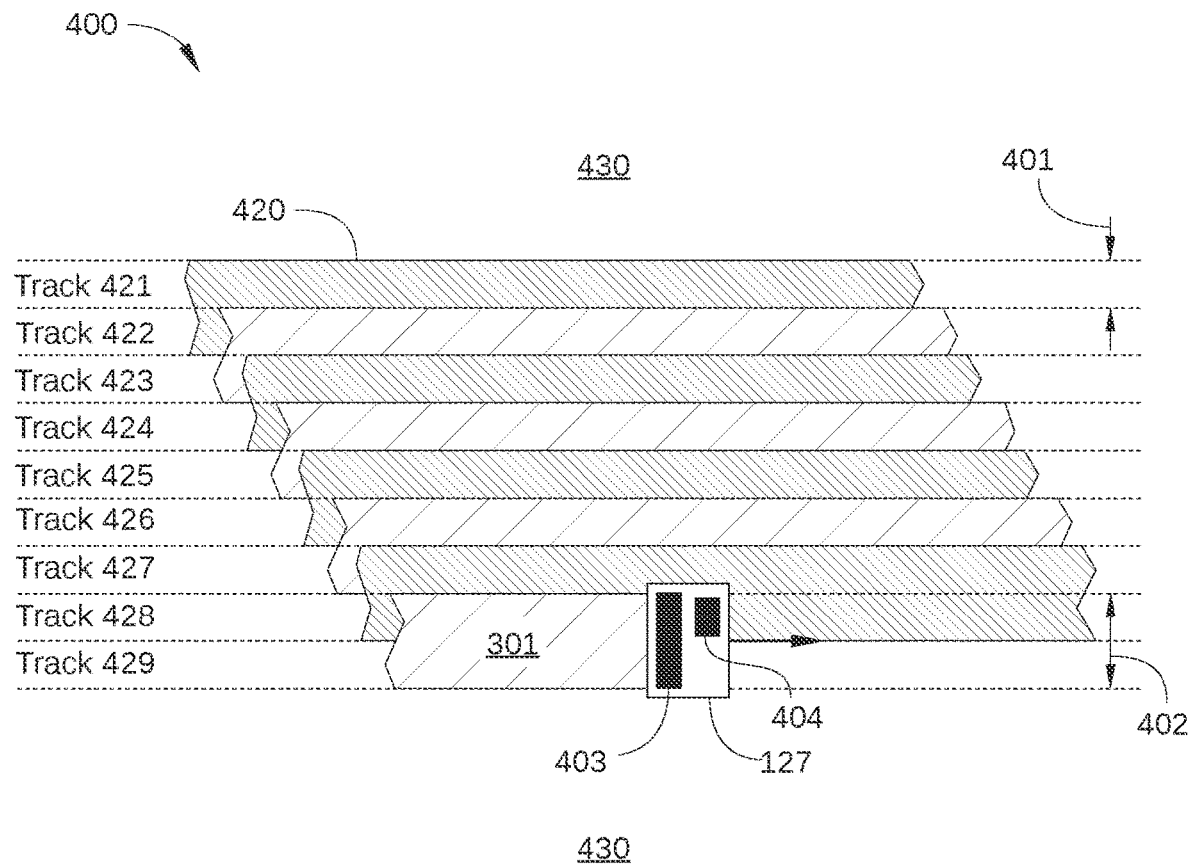
FIG. 4 is a schematic illustration of a portion of a recording surface indicated in FIG. 3 that includes a band of SMR data tracks, according to an embodiment.

FIG. 4 is a schematic illustration of a portion 400 of recording surface 112 indicated in FIG. 3 that includes a band 420 of SMR data tracks, according to an embodiment. Band 420 includes a plurality of SMR data tracks 421-429, and is separated from adjacent bands (not shown) by guard regions 430. As shown, each of SMR data tracks 421-429 overlaps and/or is overlapped by at least one adjacent SMR data track. As a result, each of SMR data tracks 421-429 has a readable width 401 that is significantly less than an as-written width 402. In FIG. 4, data has been written to SMR data tracks 421-427 and is in the process of being written to SMR data tracks 428 and 429. Due to the nature of SMR data tracks, the data shown being written to SMR data track 428 in FIG. 4 will be overwritten subsequently by data associated with SMR data track 429. It is noted that in the embodiment illustrated in FIG. 4, band 420 only includes nine SMR data tracks, whereas in practice band 420 may include up to one hundred or more SMR data tracks.

Also shown in FIG. 4 is read/write head 127, which is configured with a write head 403 and a read head 404 that are each designed for SMR. As such, read head 404 is configured with a width that is approximately equal to or less than readable width 401, and is positioned within read/write head 127 to facilitate reading of SMR data tracks 421-429. Furthermore, write head 403 is positioned within read/write head 127 to facilitate writing of SMR data tracks 421-429 with as-written width 402. In accordance with the principle of SMR, as-written width 402 exceeds readable width 401, for example by a factor of as much as two. Thus, as a particular one of SMR data tracks 421-429 is written, write head 403 is positioned to overlap a significant portion of the next SMR data track.

Returning to FIG. 3, media-cache region 320 is configured to store media-cache data entries during normal operation of HDD 100. As such, media-cache region 320 includes conventional data storage tracks, i.e., data storage tracks that are not written in an SMR format and instead are written in a conventional magnetic recording (CMR) format, and therefore are substantially non-overlapping. Thus, media-cache region 320 can be used to store random block writes without an entire band of shingled tracks being re-written for each write command received. For example, when HDD 100 receives a write command that includes write data and a range of logical block addresses (LBAs) indicated in user region 310 for the storage of the write data, the write data can be written to a physical location in media-cache region 320 rather than to the physical locations of user region 310 that correspond to the LBA range referenced in the write command. The physical location in media-cache region 320 is mapped to the LBAs associated with the write data, so that the write data can be retrieved based on LBAs included in a subsequent read command.

Write data stored in media-cache region 320 can be flushed to an appropriate band in user region 310 periodically, in response to one or more specified events, or at any other convenient time. For instance, when a particular band in user region 310 is determined to store a quantity of invalid data that exceeds a predetermined threshold quantity, data stored in that particular band can be updated by re-writing the entire band to include the most recent version of any invalid data. Thus, that particular band is rewritten to include write data that are stored in media-cache region 320 and are mapped to LBAs in that band. In addition, if the media-cache region becomes full (or nearly full), data that are stored only in media-cache 320 can be flushed to user region 310 to make more room in media-cache region 320. Generally, each block or set of data being flushed to user region 310 is associated with a particular LBA that corresponds to a particular physical location in user region 310. Therefore, each block or set of data being flushed to user region 310 is stored in a corresponding physical location in user region 310.

Non-Sequential Write Commands Received by HDD

As noted previously, in some situations, the use of media-cache region 320 to store data associated with write commands received from a host can be ineffective at preventing write amplification and associated latency. One such instance is when a host sends a large quantity of non-sequential write commands to HDD 100 that reference a large number of different SMR bands, as described below in conjunction with FIGS. 5 and 6.

Figure 5:
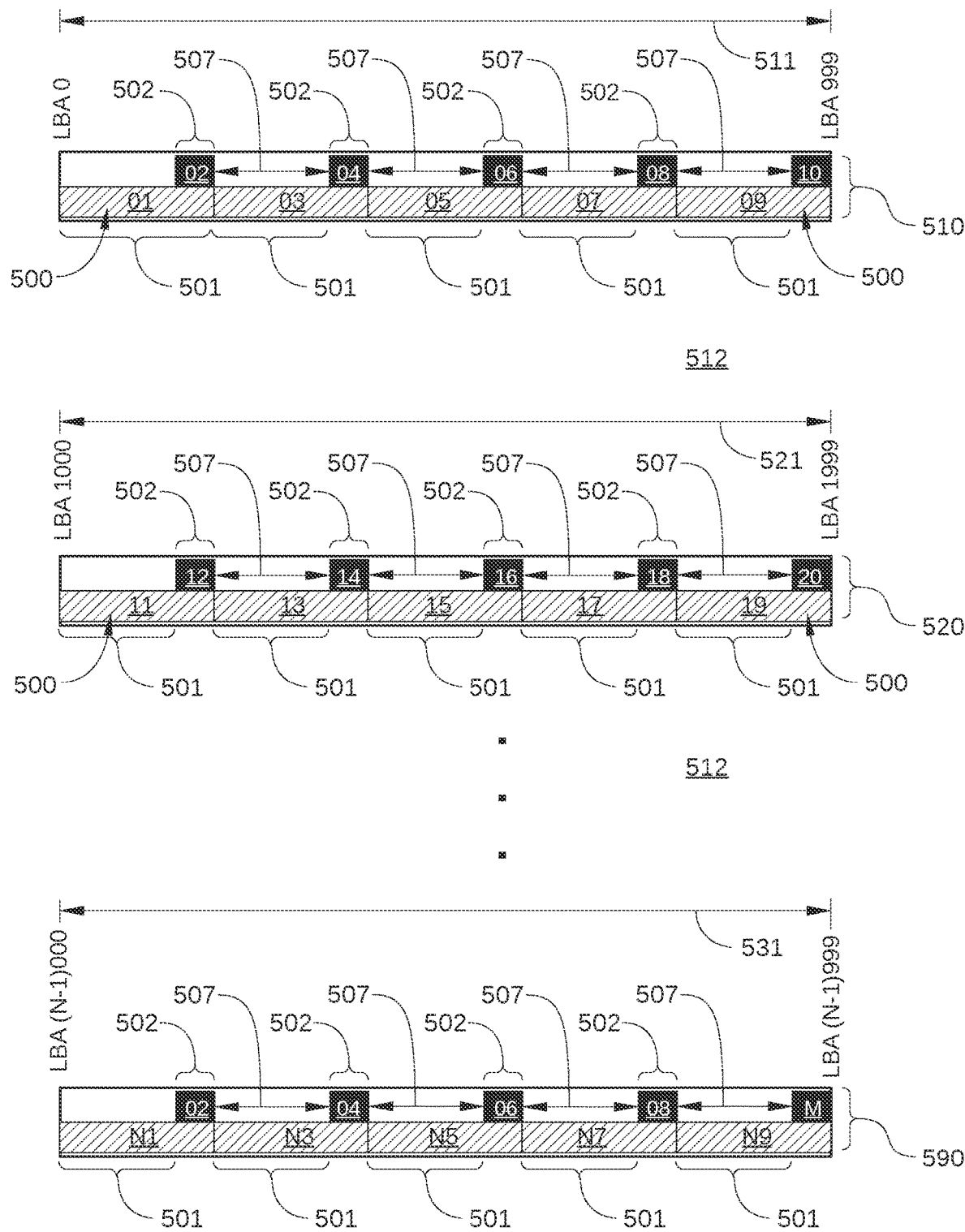
FIG. 5 schematically illustrates a series of disk access commands that are received by a hard disk drive from a host.

FIG. 5 schematically illustrates a series of disk access commands 500 that are received by HDD 100 from a host. As shown, disk access commands 500 include read commands 501 (cross-hatched) and write commands 502 (solid), where each read command 501 and write command 502 is associated with an LBA range of HDD 100. In addition, disk access commands 500 are associated with LBAs that span multiple logically contiguous SMR bands on a particular recording surface 512. For example, in the instance illustrated in FIG. 5, a total of M disk access commands 500 are associated with LBAs that span N logically contiguous SMR bands on recording surface 512, including a first SMR band 510, a second SMR band 520, and so on up to an Nth SMR band 590. Specifically, each disk access command 500 is depicted in FIG. 5 populating an associated LBA range of one of the logically contiguous SMR bands.

Disk access commands 500 are labeled with the order in which they are received from the host. As shown, the $1^{st}$ through $10^{th}$ disk access commands 500 received from the host are associated with LBA range 0-999, the $11^{th}$ through $20^{th}$ disk access commands 500 received from the host are associated with LBA range 1000-1999, and so on. In some instances, write commands 502 may not be in logical order (with increasing start-LBAs). Some commands may be out-of-order. In such instances, HDD 100 can re-order write commands in command queue 152 or elsewhere, so that the associated data can be written in sequential order. Thus, in the example illustrated in FIG. 5, disk access commands 500 are received in an order that progresses through the LBA ranges of the N logically contiguous SMR bands 510 through 590. FIG. 5 shows a portion of recording surface 512 that includes 1000 LBAs per SMR band. In practice, a typical SMR recording surface may have many more LBAs (sectors) per SMR band. The number of LBAs per SMR band may vary from one recording surface to another, and/or from one data-zone to another on a recording surface.

The N logically contiguous SMR bands associated with disk access commands 500 are generally not located adjacent to each other on a recording surface, but instead are contiguous (logically) in LBA space. For example, first SMR band 510 is logically adjacent to second SMR band 520, since first SMR band 510 is mapped to an LBA range 511 that extends from LBA 0 to LBA 999, while second SMR band 520 is mapped to an LBA range 521 that extends from LBA 1000 to LBA 1999.

In the example illustrated in FIG. 5, each write command 502 is separated in LBA space from other write commands 502 by an LBA range gap 507. Thus, some or all of write commands 502 are non-sequential write commands. In FIG. 5, each LBA range gap 507 is associated with one or more read commands 501, but in other instances, one or more LBA range gaps 507 can be associated with no other disk access command 500.

In the example illustrated in FIG. 5, each LBA in the LBA range shown is associated with a read command 501. It is noted that such a host usage pattern oftentimes occurs in RAID (Redundant Array of Independent Disks) systems, which sometimes need to scan across all of the data on a disk, and then re-write some portion of that data to the disk. For example, a RAID controller might scan a group of LBAs on each of four drives, where each LBA is associated with a physical sector that stores 4 KB of data. The RAID controller then uses the data read from all four drives to generate parity data for that group of LBAs, and write the generated parity data to a suitable subset of the group of sectors. In such a situation, which is depicted schematically in FIG. 5, the RAID controller might read all of the data from all of the drives, but only re-write one-fourth of the data (the parity data) on each drive, where a different fourth is written on each of the four different drives. Thus, in such a situation, HDD 100 receives the series of disk access commands 500 from a host as shown in FIG. 5.

Because write commands 502 are non-sequential, write commands 502 cannot be written to the associated SMR bands via a conventional bypass mode. In a conventional bypass mode, the data associated with a series of sequential write commands are written to one or more SMR bands without being first written to a location in a media cache (such as media-cache region 320 in FIG. 3). Typically, a conventional bypass mode can be employed when a series of write commands references a range of LBAs that spans one or more SMR bands. In bypass mode, the write data associated with the one or more SMR bands is received from the host, stored in volatile memory, and is then written directly to a spare SMR band. Such sequences of write commands that are written in bypass mode can be executed by an SMR HDD at or close to the maximum write speed for the SMR HDD, since the drive is writing large contiguous blocks of data to adjacent locations on a recording surface and does not seek radially to different locations on the recording surface for each write command. By contrast, in the instance shown in FIG. 5, write commands 502 are non-sequential, and do not reference a continuous LBA space that spans one or more SMR bands. Therefore, write commands 502 cannot be written in a conventional bypass mode. Instead, in a conventional HDD, the write data associated with this stream of non-sequential write commands are first stored in media-cache region 320. When disk access commands span a large number of SMR bands, media-cache region 320 can quickly be filled. Once that is the case, the performance of HDD 100 slows considerably, since newly received write commands cannot be stored in media-cache region 320. Instead, HDD 100 may need to flush data from media-cache region 320 in order to free up media cache space for new data from the host. Such media cache flush operations can take a significant amount of time, greatly reducing the drive's performance. Alternatively, HDD 100 must perform a number of separate disk access operations. For example, in some instances, to store newly received write data without first storing the write data in media-cache region 320 HDD 100 reads data from media-cache region 320 and/or from user area 310 for a particular SMR band referenced by the newly received write commands, merges the read data and the newly received write-command data, then rewrites the merged data to a spare SMR band in user region 310. Generally, each disk access operation involves a separate seek to a different location on recording surface 512, where each seek typically results in a pause of up to one disk revolution or more while a targeted location on recording surface 512 for the disk access operation rotates into position. Thus, in either case, multiple time-consuming disk access operations are performed in order to write a small quantity of new write-command data.

Figure 6:
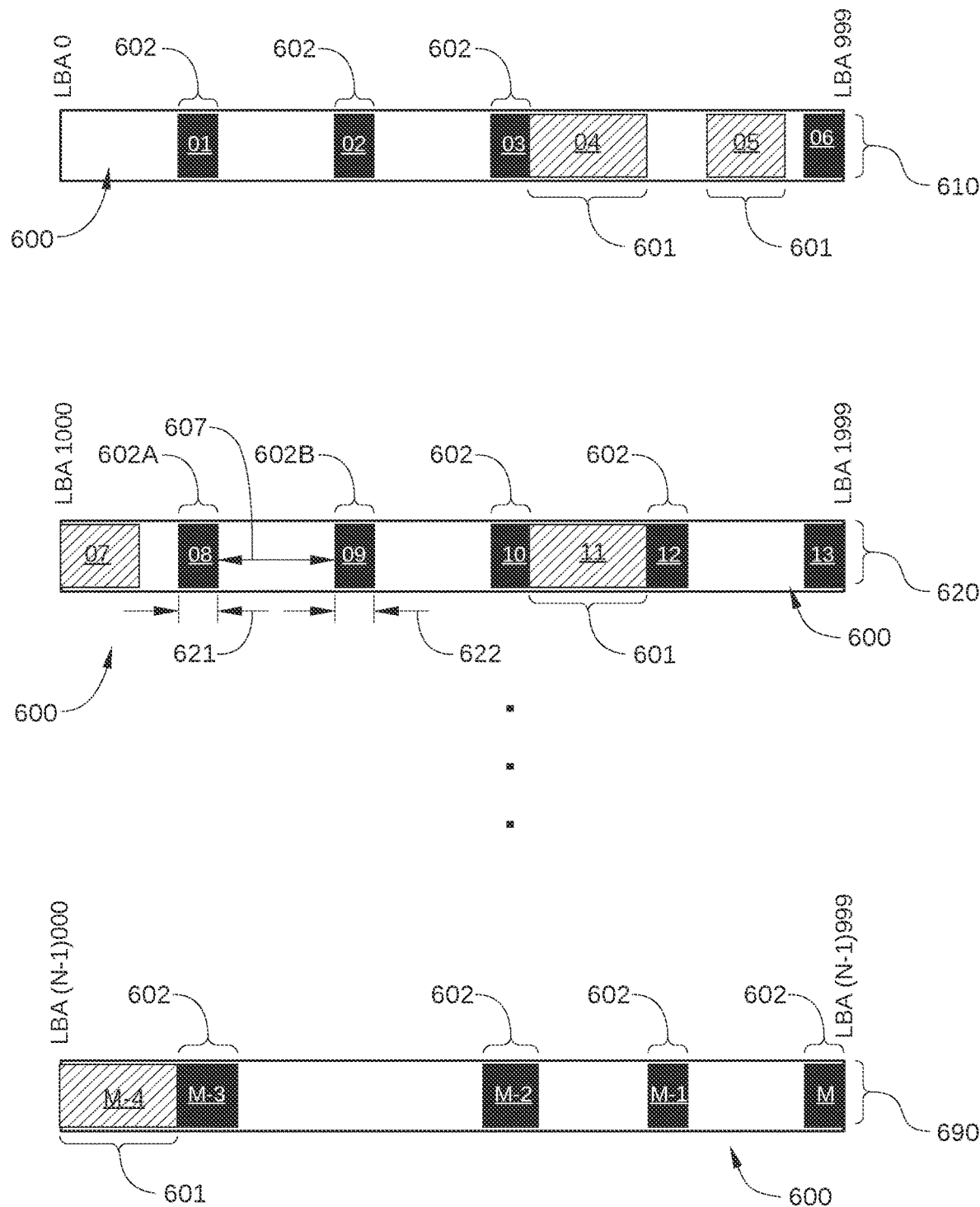
FIG. 6 schematically illustrates another series of disk access commands that are received by a hard disk drive from a host.

FIG. 6 schematically illustrates another series of disk access commands 600 that are received by HDD 100 from a host. As shown, disk access commands 600 include read commands 601 (cross-hatched) and write commands 602 (solid), where each read command 601 and write command 602 is associated with an LBA range of HDD 100. Disk access commands 600 are associated with LBAs that span multiple logically contiguous SMR bands and can be similar to disk access commands 500 of FIG. 5. For example, in FIG. 6, disk access commands 600 are associated with LBAs that span N logically contiguous SMR bands, including a first SMR band 610, a second SMR band 620, and so on up to an Nth SMR band 690. In addition, each disk access command 600 is depicted in FIG. 6 populating a respective associated LBA range of one of the logically contiguous SMR bands. Further, disk access commands 600 are labeled with the order in which they are received from the host.

In the LBA range of HDD 100 that is associated with disk access commands 500, each LBA is associated with at least one disk access command 500. By contrast, in the LBA range of HDD 100 that is associated with disk access commands 600, one or more portions of the LBA range is not associated with any disk access commands 600. As a result, in some situations, certain write commands 602 are both non-sequential write commands and are also not contiguous in LBA space with one or more read commands 601. Thus, in such situations, a first write command 602A is associated with a first LBA range 621 and a second write command 602B is associated with a second LBA range 622, where first LBA range 621 is separated from second LBA range 622 in LBA space by an LBA range gap 607. In some instances, some or all of LBA range gap 607 is not associated with any disk access command 600. Alternatively or additionally, in some instances, some or all of LBA range gap 607 is associated with one or more read commands 601. In either case, first LBA range 621 and second LBA range 622 are not contiguous, and therefore first write command 602A and second write command 602B are not sequential write commands. As a result, data associated with first write command 602A and second write command 602B cannot be written to an appropriate SMR band of HDD 100 in a single write operation unless the data associated with LBA range gap 607 can be retrieved from a volatile memory of HDD 100. When the data associated with LBA range gap 607 cannot be retrieved from a volatile memory of HDD 100, this data must be read from an existing SMR band of HDD 100 or from media-cache region 320 via a read operation that interrupts the writing of the data associated with first write command 602A and second write command 602B. Thus, in a conventional HDD, the non-sequential nature of write commands 602 in disk access commands 600 can result in significant latency in the writing of write commands 602 to a new SMR band. Alternatively, the non-sequential nature of write commands 602 in disk access commands 600 results in the storage of data associated with write commands 602 to a media cache of a conventional HDD.

Skip-Bypass Mode Example

According to various embodiments, when certain host usage patterns in disk access commands are detected by HDD 100, such as those illustrated in FIGS. 5 and 6, HDD 100 executes disk access commands received from a host in a "skip-bypass mode." Skip-bypass mode minimizes or otherwise reduces latency associated with storing non-sequential write-command data to media-cache region 320. Skip-bypass mode minimizes or otherwise reduces latency associated with reading data associated with LBA range gaps between non-sequential write commands from an existing SMR band referenced by the non-sequential write commands. Specifically, in skip-bypass mode, HDD 100 alternates between a series of sequential read operations from the existing SMR band and a series of sequential write operations to a spare SMR band that ultimately replaces the existing SMR band. In such embodiments, HDD 100 avoids most of the pauses that occur when a conventional SMR drive executes a series of non-sequential write commands and flushes data from media cache so that the non-sequential write command data can be stored. One such embodiment is described below in conjunction with FIGS. 7A-7G.

Figure 7A:
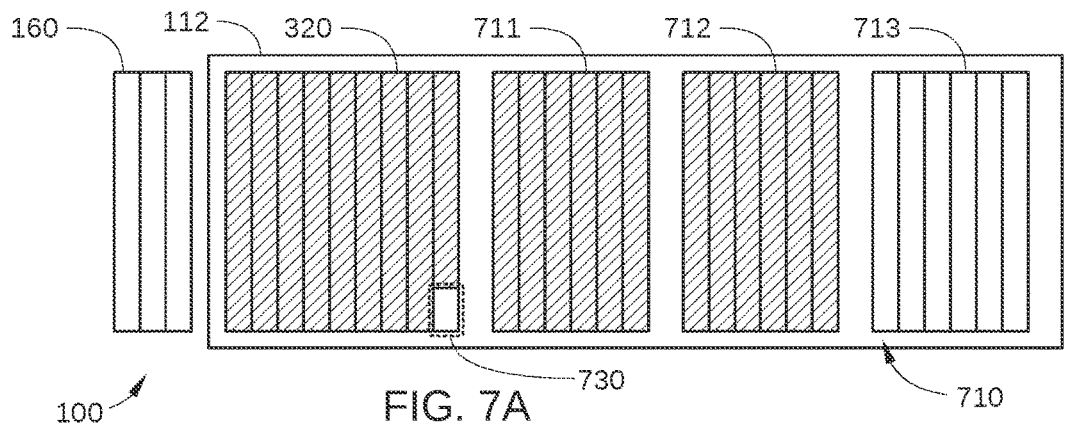
FIGS. 7A-7G schematically illustrate data storage in a hard disk drive during various steps of a skip-bypass mode, according to various embodiments.

FIGS. 7A-7G schematically illustrate data storage in HDD 100 during various steps of a skip-bypass mode, according to various embodiments. In FIG. 7A, read/write area 160 of RAM 134 (shown in FIG. 1) and a recording surface 112 of HDD 100 are shown, where recording surface 112 includes media-cache region 320 and a plurality of SMR bands 710. In the embodiment illustrated in FIG. 7A, recording surface 112 includes a first utilized SMR band 711, a second utilized SMR band 712, and a spare SMR band 713. First utilized SMR band 711 and second utilized SMR band 712 are each currently shown storing user data associated with a different LBA range. By contrast, spare SMR band 713 currently stores no user data and is available to store user data for any specific LBA range that is to be updated with new write-command data or write data flushed from media-cache region 320. For clarity, recording surface 112 is shown with only three SMR bands 710. In practice, recording surface 112 generally includes a very large number of SMR bands 710 (for example, on the order of thousands) that store user data as well as multiple spare SMR bands 713.

Read/write area 160 corresponds to the portion of RAM 134 employed for disk access operations, such as the execution of read and write commands received from a host. In the embodiment shown in FIG. 7A, read/write area 160 has a data storage capacity of about half the data storage capacity of a single SMR band 710. In other embodiments, read/write area 160 has a data storage capacity equal to or greater than an SMR band 710. As shown, read/write area 160 is currently available to store data associated with write commands and/or data read from SMR bands 710. By contrast, media-cache region 320 is full or nearly filled with user data (cross-hatched area), and only includes a small region of available storage space 730. Therefore, media-cache region 320 cannot store a significant quantity of data associated with newly received write commands without existing user data being flushed to one or more SMR bands 710.

Figure 7B:
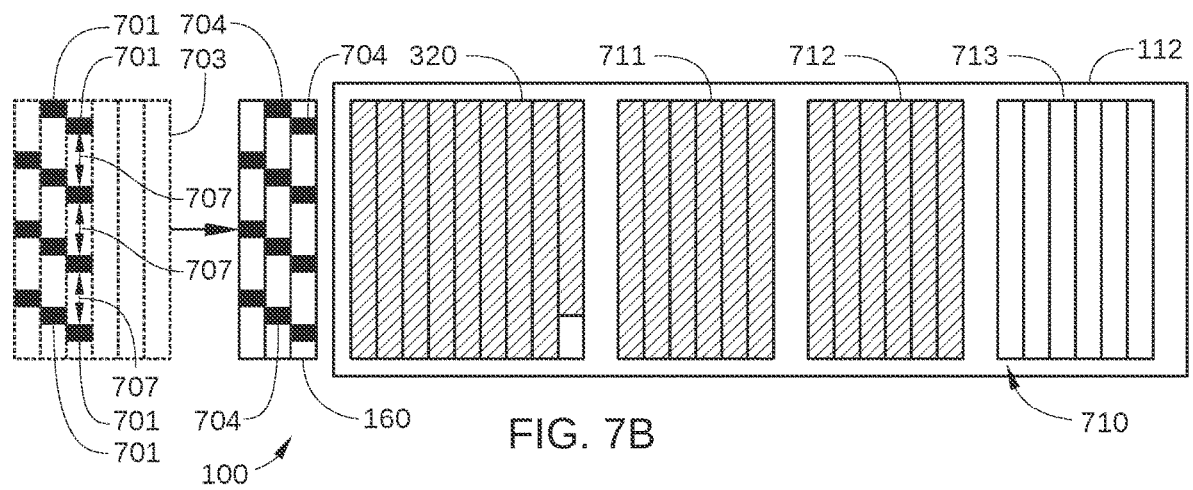

In FIG. 7B, HDD 100 receives a series of non-sequential write commands (solid) 701 that reference an LBA range 703 associated with a single SMR band, for example first utilized SMR band 711. Thus, each of non-sequential write commands 701 references a different LBA range that is associated with first utilized SMR band 711. The different LBA ranges for each non-sequential write command 701 are represented by the positioning of each non-sequential write command 701 within LBA range 703. As shown, some or all of non-sequential write commands 701 are separated in LBA space from other non-sequential write commands 701 by LBA gaps 707, and are therefore not contiguous in LBA space with other non-sequential write commands 701.

Upon receipt of non-sequential write commands 701, HDD 100 stores the write data 704 associated with non-sequential write commands 701 in read/write area 160. In FIG. 7B, for purposes of explanation, write data 704 are depicted being stored in read/write area 160 in physical locations that correspond to the LBA ranges within LBA range 703 associated with each non-sequential write command 701. In practice, write data 704 can be stored in any physical location that is available within read/write area 160.

Figure 7C:
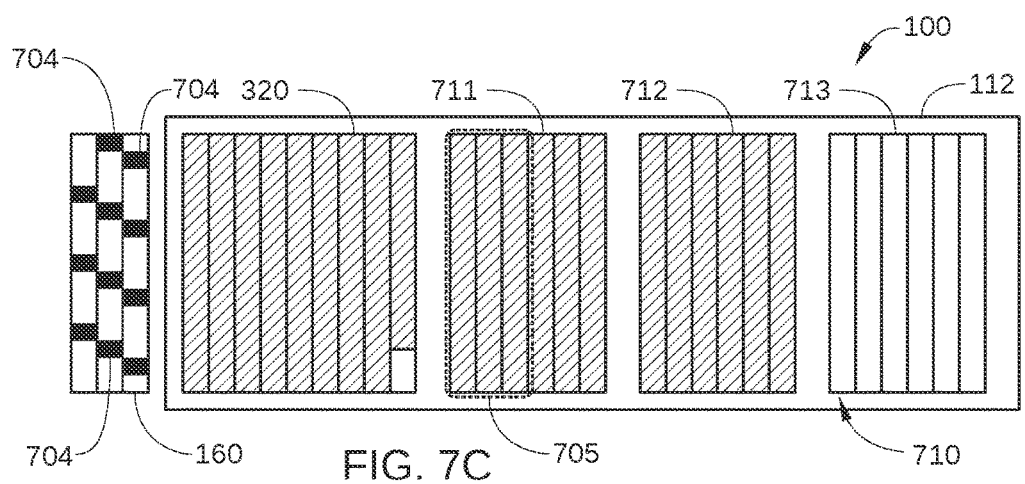

In FIG. 7C, HDD 100 prepares to write non-sequential write commands 701 (shown in FIG. 7B) to spare SMR band 713. This is because HDD 100 is currently operating in skip-bypass mode. Unlike a conventional mode of operation, in skip-bypass mode, HDD 100 does not store write data 704 for non-sequential write commands 701 in media-cache region 320. Instead, HDD 100 updates the SMR band associated with non-sequential write commands 701 by rewriting the data stored in first utilized SMR band 711 to a new SMR band, such as spare SMR band 713, where the data written to the new SMR band is updated with the write data 704 associated with non-sequential write commands 701. Consequently, in FIG. 7C, HDD 100 reads data 705 from a portion of first utilized SMR band 711, which is the SMR band that includes the LBA ranges referenced by non-sequential write commands 701.

In some embodiments, HDD 100 reads data 705 in a single sequential read operation. Thus, in such embodiments, the reading of data 705 is performed via a single seek operation of a read/write head of HDD 100 to first utilized SMR band 711. In some embodiments, HDD 100 performs the single seek operation and subsequent sequential read operation in response to receiving one or more of non-sequential write commands 701. Therefore, in some embodiments, HDD 100 can start the seek operation before all of non-sequential write commands 701 are received by HDD 100. In some embodiments, the amount of data 705 read from first utilized SMR band 711 in the sequential read operation is based on available storage capacity of read/write area 160. In the embodiment illustrated in FIG. 7C, the available storage capacity of read/write area 160 is on the order of about one half the storage capacity of an SMR band 710. In other embodiments, the available storage capacity of read/write area 160 can be less than one half the storage capacity of an SMR band 710, greater than one half the storage capacity of an SMR band 710, or equal to or greater than the storage capacity of an SMR band 710.

Figure 7D:
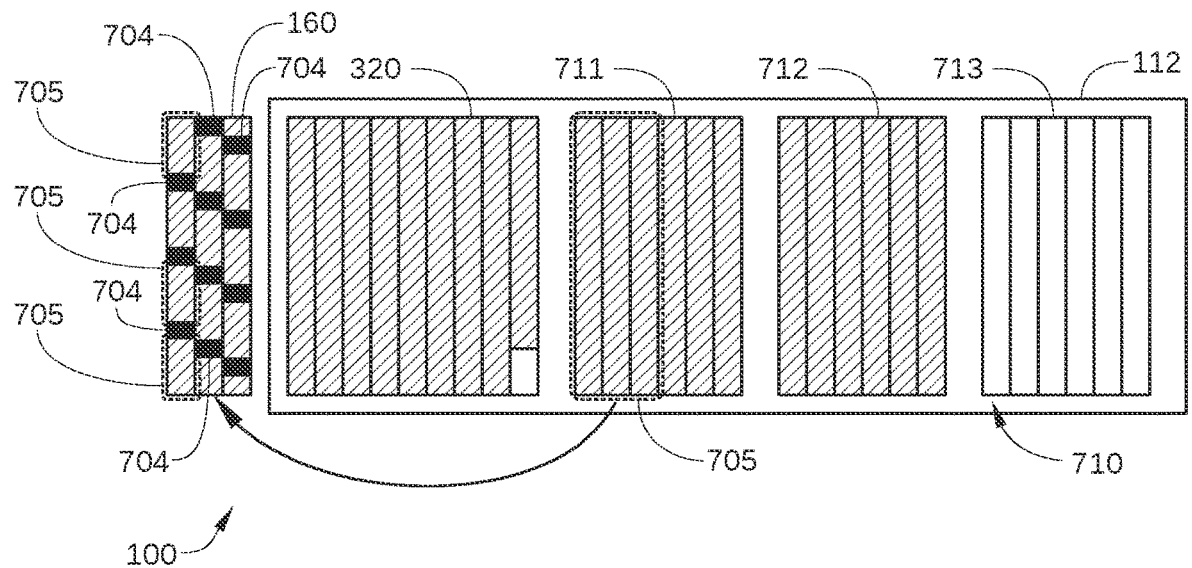

In FIG. 7D, HDD 100 stores the data 705 (cross-hatched) read from first utilized SMR band 711 in read/write area 160. While FIG. 7D depicts the storage of data 705 as a process that occurs after data 705 are read from first utilized SMR band 711, in practice data 705 are generally stored in read/write area 160 as they are read from first utilized SMR band 711. Thus, the storage of some portions of data 705 in read/write area 160 typically occurs concurrently with the reading of other portions of data 705 from first utilized SMR band 711. In FIG. 7D, for purposes of explanation, data 705 are depicted being stored in read/write area 160 in physical locations that correspond to the LBA ranges from which data 705 are read from first utilized SMR band 711. In practice, data 705 can be stored in any physical location that is available within read/write area 160.

Figure 7E:
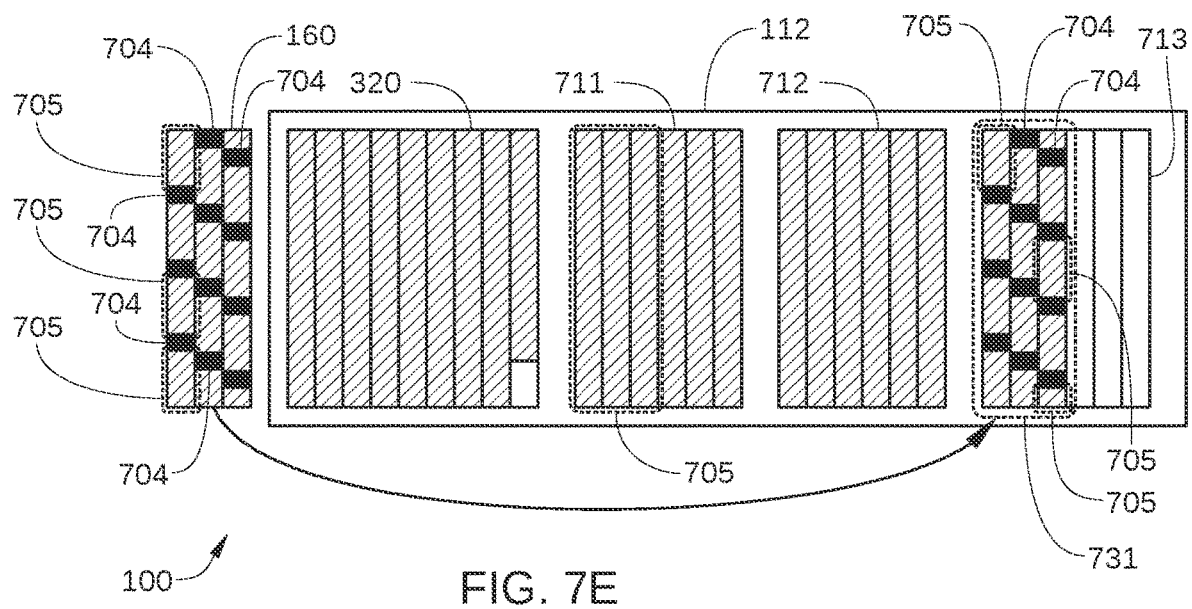

In FIG. 7E, HDD 100 writes write data 704 and portions of data 705 to a first portion 731 of spare SMR band 713 in a single sequential write operation, where the portions of data 705 are associated with LBAs that are not included in LBA ranges referenced by non-sequential write commands 701. As shown, write data 704 are written to the LBA ranges associated with write commands 701 (shown in FIG. 7B) and data 705 are written to the LBA ranges in SMR band 713 corresponding to the physical locations in first utilized SMR band 711 from which data 705 were read. In some embodiments, HDD 100 writes write data 704 and data 705 to physical locations in spare SMR band 713 that correspond to the appropriate LBA ranges as shown by merging or otherwise combining write data 704 and data 705 prior to the sequential write operation. For example, in some embodiments, HDD 100 determines a write order for the various portions of write data 704 and data 705 stored in read/write area 160 prior to the sequential write operation. In some embodiments, such a write order can be determined via conventional logic circuitry well-known in the art and included in microprocessor-based controller 133 of FIG. 1A. In such embodiments, the write order of write data 704 and data 705 to spare SMR band 713 can be implemented via linked lists and/or any other suitable data structures that store a collection of data elements dynamically. In some embodiments, suitable linked-list circuitry is included in microprocessor-based controller 133 for this purpose.

For purposes of clarity, in the embodiment described above in conjunction with FIG. 7E, none of the data written to spare SMR band 713 were read from media-cache region 320. In practice, in some instances, a portion of data 705 is read from media-cache 320, for example when media-cache region 320 contains the only valid copy of data for the associated LBAs being written to in spare SMR band 713. In such instances, HDD 100 may read some portions of data 705 from first utilized SMR band 711 and some portions of data 705 from media-cache region 320. For the example of a drive in a RAID system that is updating parity-bits, such occurrences will generally be rare, since media-cache region 320 may only contain a small fraction of the data stored by HDD 100.

In the embodiment illustrated in FIG. 7E, first portion 731 is approximately equal to half of spare SMR band 713. In other embodiments, depending on the available storage capacity of read/write area 160, first portion 731 can be equal to a smaller or larger fraction of spare SMR band 713. In other embodiments, when read/write area 160 has sufficient available storage capacity, first portion 731 can be equal to spare SMR band 713.

Figure 7F:
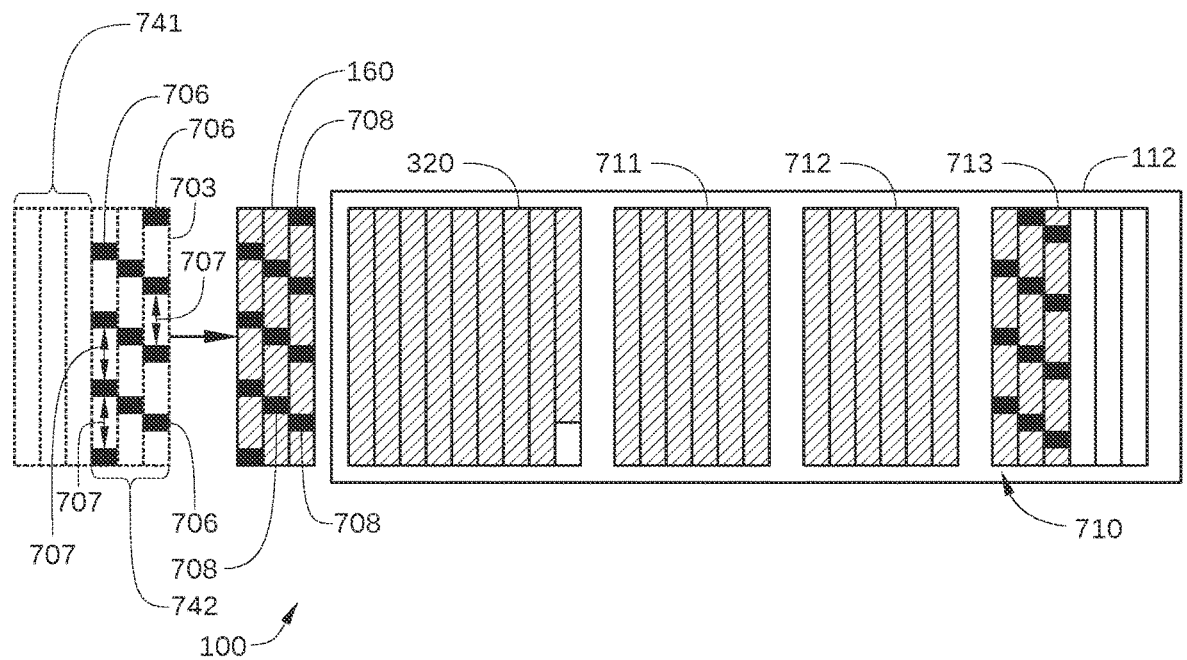

In FIG. 7F, HDD 100 receives another series of non-sequential write commands (solid) 706 that reference LBA range 703, which is associated with first utilized SMR band 711. As with non-sequential write commands 701, each of non-sequential write commands 706 references a different LBA range that is associated with first utilized SMR band 711, and some or all of non-sequential write commands 706 are separated in LBA space from other non-sequential write commands 706. Therefore, some or all of non-sequential write commands 706 are not contiguous in LBA space with other non-sequential write commands 706 and instead are separated in LBA space from other non-sequential write commands 706 by LBA gaps 707. In the embodiment shown in FIG. 7F, non-sequential write commands 706 are associated with LBA ranges that do not overlap with the LBA ranges associated with non-sequential write commands 701. Thus, in the embodiment, non-sequential write commands 701 reference LBAs located within a first portion 741 of LBA range 703 while non-sequential write commands 706 reference LBAs located within a second portion 742 of LBA range 703. In some embodiments, first portion 741 does not overlap second portion 742, so that no LBAs included in portion 741 are also included in second portion 742.

Upon receipt of non-sequential write commands 706, HDD 100 stores the write data 708 associated therewith in read/write area 160. In FIG. 7F, for purposes of explanation, write data 708 are depicted being stored in read/write area 160 in physical locations that correspond to the LBA ranges associated with each non-sequential write command 706. In practice, write data 708 can be stored in any physical location that is available within read/write area 160.

Figure 7G:
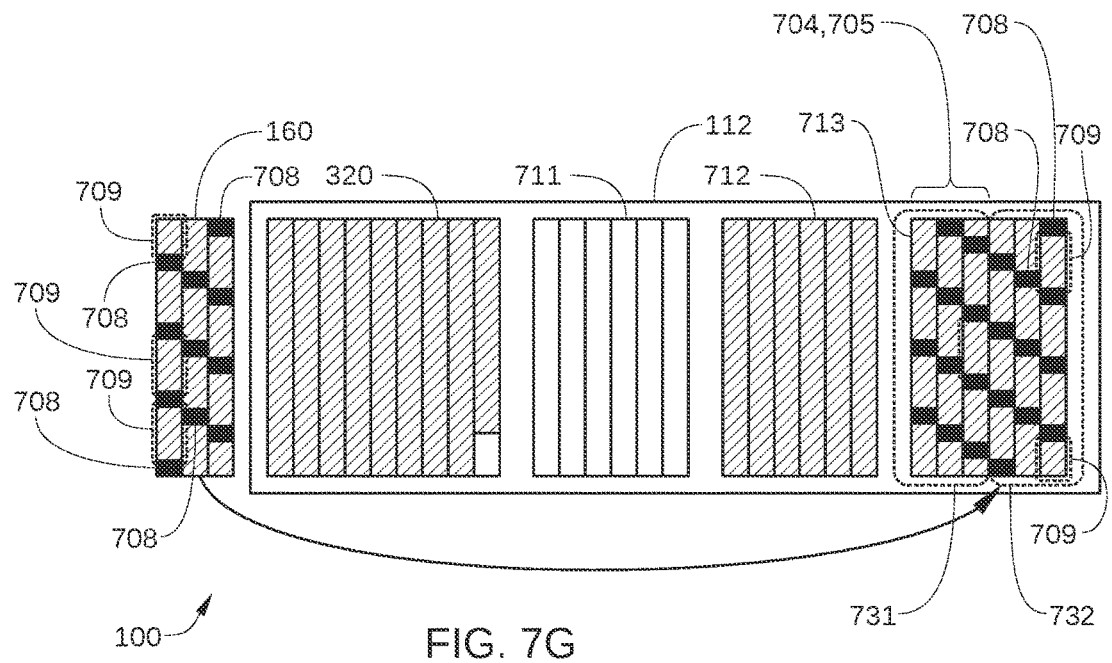

FIG. 7G illustrates HDD 100 after the above-described process shown in FIGS. 7C-7E is repeated for non-sequential write commands 706. Thus, write data 708 and data 709 (cross-hatched) that are read from first utilized SMR band 711 are shown written to a second portion 732 of spare SMR band 713 after a single sequential write operation. Further, write data 708 are written to the LBA ranges associated with write commands 706 and data 709 are written to the LBA ranges corresponding to the physical locations in first utilized SMR band 711 from which data 709 were read. In some embodiments, HDD 100 merges write data 708 and data 709 prior to writing write data 708 and data 709 to physical locations in spare SMR band 713, for example via linked lists or other suitable data structures. As a result, spare SMR band 713 stores valid user data and is no longer designated as a spare SMR band. Further, HDD 100 designates first utilized SMR band 711 to now act as a spare SMR band, and any user data currently stored in first utilized SMR band 711 is invalidated.

For clarity, in the above-described embodiments, non-sequential write commands 701 are shown being received as a first set of write commands and non-sequential write commands 706 are shown being received subsequently as a second set of write commands. In practice, non-sequential write commands 701 and non-sequential write commands 706 can be received from a host in a single stream. Further, HDD 100 can receive non-sequential write commands 706 while performing the operations illustrated in FIGS. 7C, 7D, and/or 7E. Thus, in many instances, HDD 100 performs a read or write operations while simultaneously receiving non-sequential write commands 701 and/or non-sequential write commands 706.

Use of Skip-Bypass Mode in Operation

According to various embodiments, when certain host usage patterns in disk access commands are detected by HDD 100, such as those illustrated in FIGS. 5 and 6, HDD 100 executes disk access commands received from a host in skip-bypass mode. Further, under certain conditions, HDD 100 changes from skip-bypass mode to a normal mode of executing disk access commands or to a bypass mode of executing disk access commands. One such embodiment is described below in conjunction with FIG. 8.

Figure 8:
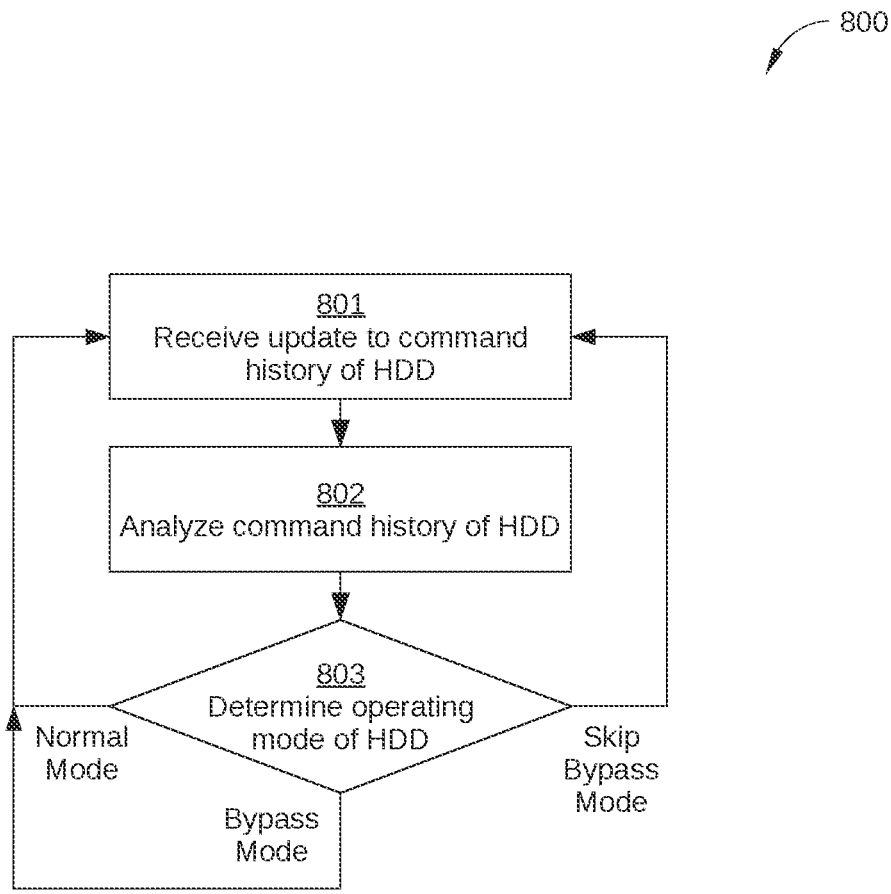
FIG. 8 sets forth a flowchart of method steps for determining a mode of operation of a shingled magnetic recording hard disk drive, according to an embodiment.

FIG. 8 sets forth a flowchart of method steps for determining a mode of operation of an SMR HDD, according to an embodiment. Although the method steps are described in conjunction with HDD 100 of FIGS. 1-7G, persons skilled in the art will understand that the method steps may be performed with other types of systems. The control algorithms for the method steps reside in a suitable controller, such as microprocessor-based controller 133, in whole or in part as software- or firmware-implemented logic, and/or as hardware-implemented logic circuits.

As shown, a method 800 begins at step 801, when a suitable controller associated with HDD 100 receives an update to a command history of HDD 100. In some embodiments, the command history that is updated is included in executed command list 151, such as metadata, a record, and/or other information stored in executed command list 151. In such embodiments, the command history is updated in step 801 when a read or write command previously received from a host by HDD 100 is executed by HDD 100. Alternatively or additionally, in some embodiments, the command history that is updated is included in command queue 152, such as metadata, a record, and/or other information stored in command queue 152. In such embodiments, the command history is updated in step 801 when HDD 100 receives a read or write command from a host.

In step 802, the controller analyzes the current command history. Specifically, the controller checks the current command history for one or more particular patterns of host access (described below) to HDD 100. In some embodiments, the controller performs the analysis based on the updated executed command list 151. In some embodiments, the controller performs the analysis based on the updated command queue 152. In some embodiments, the controller performs the analysis based on a combination of the updated executed command list 151 and the updated command queue 152.

In step 803, the controller determines a suitable mode of executing disk access commands based on whether one or more of the particular patterns of host access are detected in step 802. In the embodiment illustrated in FIG. 8, the controller selects the mode from: a normal mode, a bypass mode, and a skip-bypass mode.

In some embodiments, the controller determines the suitable mode of executing disk access commands further based on the current mode in which HDD 100 is currently executing disk access operations. Thus, in such embodiments, the specified conditions for entering a particular mode may differ from the specified conditions for exiting that particular mode. For example, the one or more conditions for exiting the current mode can be different than the converse of the one or more conditions for previously entering the current mode (i.e., different than the absence of the one or more conditions for exiting the current mode).

In some embodiments, in step 803, the controller determines that the suitable mode for HDD 100 is normal mode when conditions for entering (or remaining in) bypass mode and entering (or remaining in) skip-bypass mode are not met. For example, when HDD 100 is executing disk access commands in bypass mode and the controller determines that conditions for remaining in bypass mode are not met, the controller determines the suitable mode for HDD 100 is normal mode. In another example, when HDD 100 is executing disk access commands in normal mode and the controller determines that conditions for entering bypass mode are not met and the conditions for entering skip-bypass mode are not met, the controller determines the suitable mode for HDD 100 is normal mode. In some embodiments, the conditions for entering bypass mode and/or the conditions for entering skip-bypass mode may include one or more particular patterns of host access to HDD 100.

In some embodiments, in normal mode, when HDD 100 receives data associated with write commands that are non-sequential in LBA space, HDD 100 stores the data in media-cache region 320. Further, in some embodiments, while HDD is in normal mode, when the size of available storage space 730 of media-cache region 320 falls below a minimum allowable value, HDD 100 performs one or more flush-cache operations prior to storing such data associated with write commands in media-cache region 320. As noted previously, when a protracted stream of such write commands are received from a host, the performance of HDD 100 can drop considerably once the size of available storage space 730 of media-cache region 320 falls below a minimum allowable value.

In some embodiments, in step 803, the controller determines that the suitable mode for HDD 100 is bypass mode when conditions for entering bypass mode are met or, when HDD 100 is currently in bypass mode, when conditions for remaining in bypass mode are met. In some embodiments, one condition for entering bypass mode is when HDD 100 receives a series of write commands that result in a sequential write operation with a duration greater than a threshold number of LBAs, for example write commands that include on the order of 10 s of megabytes of write data. It is noted that, in an SMR HDD, such as HDD 100, a sequential write operation to an SMR band in user region 310 includes continuous writing of data to the SMR band for all LBAs within a particular LBA range. Thus, there is no gap in write data for the particular LBA range over which the sequential write operation occurs. Consequently, in bypass mode, storage capacity of media-cache region 320 is not employed to temporarily store the data associated with the write commands for that particular LBA range. Instead, the data associated with the write commands for that particular LBA range "bypasses" media-cache region 320, and are written directly to the appropriate SMR band in user region 310 from RAM 134. As a result, the process of writing this data to user region 310 is not interrupted by repeated seeks to media-cache region 320 in order to read data for gaps in the write data for the particular LBA range. Thus, in bypass mode, HDD 100 can write data to an SMR band at or close to the maximum write speed for HDD 100.

It is noted that each SMR band of user region 310 is written from the starting LBA to the ending LBA, and random writes within the SMR band cannot be performed. Thus, in some embodiments, a further condition for entering bypass mode is that a received write command or series of write commands includes or references a starting LBA for an SMR band of HDD 100. Thus, in such embodiments, bypass mode does not begin until data are to be written to a starting LBA for an SMR band. It is further noted that, in some instances in which HDD 100 is currently in bypass mode, the conditions the controller uses to determine that the suitable mode for HDD 100 is bypass mode can include the presence of data retrieved in response to a gap in write data being available in RAM 134. Such data can be used to fill the write gap and therefore enable HDD 100 to continue on in bypass mode.

In some embodiments, while HDD 100 is in bypass mode, HDD 100 may determine that there is a gap in write data to be written in bypass mode that can be retrieved via a short interruption of bypass mode. In such embodiments, HDD 100 temporarily halts the sequential writing of write commands and retrieves data for the gap, then restarts the sequential writing. In some embodiments, such a gap is detected when a series of sequential write commands received from a host do not entirely span all LBAs and have a gap in LBAs that is less than a threshold number of LBAs. In some embodiments, the threshold number of LBAs is a fixed maximum number of LBAs. In other embodiments, the threshold number of LBAs corresponds to a set fraction of the number of LBAs associated with an SMR band in user area 310, such as one tenth the number of LBAs included in an SMR band. In yet other embodiments, the threshold number of LBAs corresponds to a number of LBAs associated with a certain number of revolutions of storage disk 110, such as 0.5 revolutions, 1.0 revolution, 1.5 revolutions, 2.0 revolutions, etc. In instances in which a gap in write data exceeds the threshold condition (e.g., maximum number of LBAs or revolutions), such a gap is considered a condition to exit bypass mode.

In some embodiments, to retrieve data for a detected gap in write data detected while in bypass mode, HDD 100 retrieves such data by pausing the current bypass mode and performs a read of the data that corresponds to the LBAs associated with the detected gap in write data. For example, HDD 100 may read the data that corresponds to the LBAs associated with the gap in write data from an appropriate SMR band in user area 310 and/or from media-cache region 320. Upon completion of the retrieval of the data that corresponds to the LBAs associated with the gap in write data, the controller returns HDD 100 to bypass mode, and write command data are written directly to the appropriate SMR band in user region 310 from RAM 134.

In some embodiments, in step 803, the controller determines that the suitable mode for HDD 100 is skip-bypass mode when conditions for entering skip-bypass mode are met or, when HDD 100 is currently in skip-bypass mode, when conditions for remaining in skip-bypass mode are met. In some embodiments, a first condition for entering skip-bypass mode is when HDD 100 receives a series of commands from a host that includes multiple non-sequential write commands. Examples of such a series of commands includes disk access commands 500 or write commands 502 in FIG. 5 and disk access commands 600 or write commands 602 in FIG. 6. As shown in FIGS. 5 and 6, each of these examples of a series of commands includes multiple instances of write commands that are separated by gaps in LBA space and therefore do not reference a continuous LBA range. That is, each of these series of commands includes multiple instances where a first write command or series of write commands references a first range of contiguous LBAs, a second write command or series of write commands references a second range of contiguous LBAs that is not contiguous with the first range of contiguous LBAs, and no write command or series of write commands references a range of contiguous LBAs that fills the gap in LBA space between the first range of contiguous LBAs and the second range of contiguous LBAs.

In some embodiments, a further aspect of the first condition can be that the number of non-sequential write commands included in the series of commands from the host exceeds a threshold number. For example, in some embodiments, the threshold number of non-sequential write commands is a fixed minimum number of discrete write commands, e.g., 50, 100, 200, 500, etc. Thus, in such embodiments, when a series of commands from the host includes at least this fixed minimum number of non-sequential write commands, and does not merely include multiple non-sequential write commands, the first condition for entering skip-bypass mode is met. In other embodiments, the threshold number of non-sequential write commands can be a variable number that varies based on one or more factors associated with operation of HDD 100, such as the size of available storage space 730 in media cache 320 and/or available memory in RAM 134. For example, in one such embodiment, as the size of available storage space 730 in media cache 320 decreases, the threshold number of non-sequential write commands included in the series of commands from the host also decreases, thereby causing HDD 100 to enter skip-bypass mode more easily.

It is noted that HDD 100 cannot write such a series of commands from a host in bypass mode, even when the series of commands spans a large LBA range (e.g., an LBA range that includes multiple SMR bands). This is because each gap in LBA space between a first range of contiguous LBAs and a second range of contiguous LBAs corresponds to a gap in write data that has not been received from the host, and therefore must be read from, for example, user area 310. Thus, unless each gap in write data for this series of commands corresponds to valid data currently in read/write area 160, a single sequential write process cannot be employed to execute this series of write commands.

In some embodiments, a second condition for entering skip-bypass mode is when HDD 100 receives a series of commands from a host that references a span of LBAs that exceeds a threshold number of LBAs. For example, in some embodiments, the threshold number of LBAs is a fixed minimum number of LBAs, e.g., 5000 LBA sectors. Thus, in such embodiments, when 4 kb (4096 byte) sectors are employed in HDD 100 and a series of commands from the host spans 5000 such sectors, the second condition for entering skip-bypass mode is met. In some embodiments, the fixed minimum number of LBAs corresponds to a set fraction of the number of LBAs associated with an SMR band in user area 310, such as one half the number of LBAs included in an SMR band, three quarters the number of LBAs included in an SMR band, and the like. It is noted that in some instances, user area 310 can include SMR bands of different sizes. Therefore, in such instances, when the threshold number of LBAs corresponds to a set fraction of the number of LBAs associated with SMR bands, the threshold number of LBAs for satisfying the second condition may vary depending on the size of the SMR band or bands that correspond to the series of commands.

In some embodiments, for the second condition, the fixed minimum number of LBAs corresponds to a set number of SMR bands, such as one, two, five, ten, etc. Thus, in such embodiments, when a series of non-sequential write commands received from a host reference a spans a range of LBAs that corresponds to this set number of SMR bands, the second condition for entering skip-bypass mode is met. In other embodiments, to avoid frequently switching into and out of skip-bypass mode, the threshold number of LBAs for satisfying the second condition corresponds to a relatively large number of SMR bands, for example on the order of 10 s or 100 s. In such embodiments, the second condition for entering skip-bypass mode is not met unless the specified pattern of host access occurs over a significant number of disk access commands, and the pattern of host access is well-established and likely to continue for a significant number of disk access commands.

In some embodiments, a third condition for entering skip-bypass mode is when HDD 100 receives a series of commands from a host that includes a first LBA of an SMR band in user area 310, and therefore references a beginning of the SMR band. Thus, in such embodiments, when the series of commands spans the beginning of an SMR band, the third condition for entering skip-bypass mode is met.

In some embodiments, a fourth condition for entering skip-bypass mode is when HDD 100 receives a series of commands from a host that includes a number of non-sequential write commands and/or disk access commands, where the number of non-sequential write commands or disk access commands exceeds a threshold number. Thus, in such embodiments, when a series of commands is received from the host, and the number of non-sequential write commands and/or disk access commands associated with the series of commands exceeds the threshold number, the fourth condition for entering skip-bypass mode is met.

In some embodiments, a fifth condition for entering skip-bypass mode is when HDD 100 determines that a series of disk access commands matches a specific pattern of host access. Thus, in such embodiments, the determination that a series of previously executed disk access commands matches a specific pattern of host access commands meets the fifth condition and indicates that HDD 100 enters skip-bypass mode. In some embodiments, the series of disk access commands that matches the specific pattern of host access includes previously executed disk access commands, such as disk access commands included in executed command list 151. Alternatively or additionally, in some embodiments, the series of disk access commands that matches the specific pattern of host access includes disk access commands that are received from host 108 but are not yet executed, such as disk access commands included in command queue 152.

In some embodiments, the specific pattern of host access commands includes a series of disk access commands that reference progressively higher LBA ranges. Thus, in such embodiments, a first disk access command in the series of disk access commands references a first LBA range, a second disk access command that follows the first disk access command references a second LBA range that is higher than the first LBA range, a third disk access command that follows the second disk access command references a third LBA range that is higher than the second LBA range, and so on. In such embodiments, the LBA ranges referenced by the disk access commands in the series of disk access commands may be contiguous LBA ranges or non-sequential LBA ranges.

In some embodiments, the specific pattern of host access commands includes a series of disk access commands that reference progressively lower LBA ranges. Thus, in such embodiments, a first disk access command in the series of disk access commands references a first LBA range, a second disk access command that follows the first disk access command references a second LBA range that is lower than the first LBA range, a third disk access command that follows the second disk access command references a third LBA range that is lower than the second LBA range, and so on. In such embodiments, the LBA ranges referenced by the disk access commands in the series of disk access commands may be contiguous LBA ranges or non-sequential LBA ranges.

In some embodiments, the specific pattern of host access commands includes a series of disk access commands that reference LBA ranges that progress through a series of a specified number of SMR bands that are logically adjacent (e.g., 10 logically adjacent SMR bands, 20 logically adjacent SMR bands, 30 logically adjacent SMR bands, etc.). For example, in some embodiments, to meet the specific pattern of host access commands, the disk access commands in the series of disk access commands sequentially reference LBA ranges that progressively increase through the specified number of logically adjacent SMR bands. Alternatively or additionally, in some embodiments, to meet the specific pattern of host access commands, the disk access commands in the series of disk access commands sequentially reference LBA ranges that progressively decrease through the specified number of logically adjacent SMR bands.

In some embodiments, in step 803, HDD 100 enters skip-bypass mode when a combination of two or more of the above-described conditions are met. In some embodiments, detection of a single specific combination of the above-described conditions causes HDD 100 to enter skip-bypass mode. Alternatively, in some embodiments, multiple different combinations of the above-described conditions can cause HDD 100 to enter skip-bypass mode. For example, in one such embodiment, HDD 100 enters skip-bypass mode when the first condition and the second condition are met, or when the first condition and the third condition are met.

In some embodiments, in step 803, HDD 100 exits skip-bypass mode when one or more of the above-described conditions are not met. In such embodiments, the one or more conditions for exiting skip-bypass mode can be different than the converse of the one or more conditions for entering skip-bypass mode (i.e., different than the absence of the one or more conditions for exiting skip-bypass mode). For example, in some embodiments, detection of a first combination of two or more of the above-described conditions causes HDD 100 to enter skip-bypass mode, while failure to detect a second combination of two or more of the above-described conditions causes HDD 100 to exit skip-bypass mode. Alternatively, in some embodiments, detection of one particular condition or a combination of conditions causes HDD 100 to enter skip-bypass mode, while detection of the absence of that particular condition or a combination of conditions causes HDD 100 to exit skip-bypass mode. Alternatively, in some embodiments, detection of one particular condition or combination of conditions causes HDD 100 to enter skip-bypass mode, while detection of the absence of a modified version of that particular condition or combination of conditions causes HDD 100 to exit skip-bypass mode. For example, in one such embodiment, HDD 100 enters skip-bypass mode when a first version of the first condition (e.g., where the threshold number of non-sequential write commands is 100) and a first version of the second condition (e.g., where the threshold number of LBAs is 1000) are detected, and HDD 100 exits skip-bypass mode when a second version of the first condition (e.g., where the threshold number of non-sequential write commands is 50) and a second version of the second condition (e.g., where the threshold number of LBAs is 500) are not met.

Figure 9:
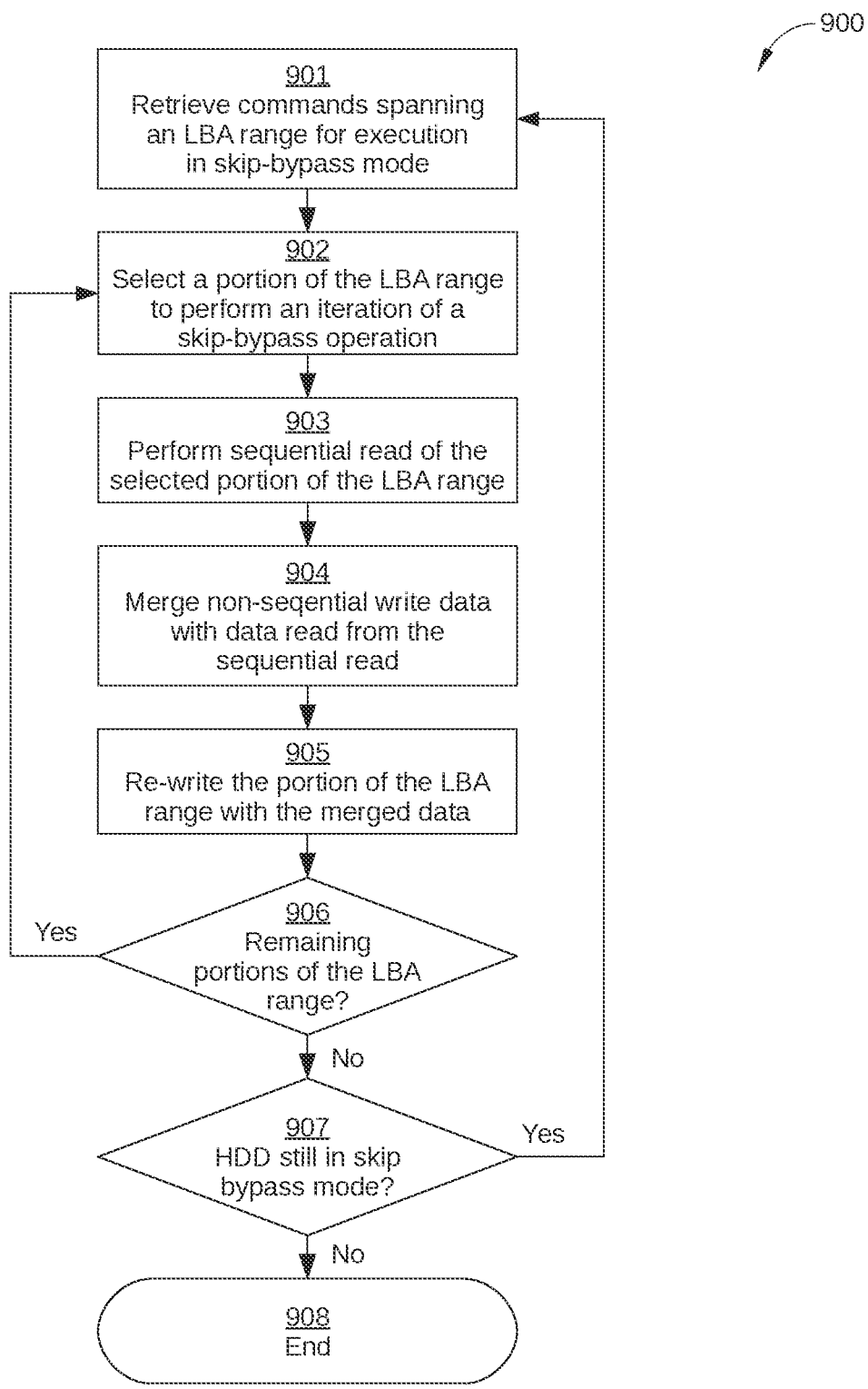
FIG. 9 sets forth a flowchart of method steps for performing a skip-bypass mode of operation in a shingled magnetic recording hard disk drive, according to an embodiment.

FIG. 9 sets forth a flowchart of method steps for performing a skip-bypass mode of operation in an SMR HDD, according to an embodiment. Although the method steps are described in conjunction with HDD 100 of FIGS. 1-7G, persons skilled in the art will understand that the method steps may be performed with other types of systems. The control algorithms for the method steps reside in a suitable controller, such as microprocessor-based controller 133, in whole or in part as software- or firmware-implemented logic, and/or as hardware-implemented logic circuits.

Method 900 begins when a suitable controller associated with HDD 100 determines that HDD 100 enters skip-bypass mode, for example based on a command history of HDD 100. As described above, in some embodiments, the command history is based on information included in executed command list 151; in some embodiments, the command history is based on information included in command queue 152; and, in some embodiments, the command history is based on information included in both executed command list 151 and information included in command queue 152.

As shown, a method 900 begins at step 901. The controller retrieves commands for execution in skip-bypass mode, for example from command queue 152. Generally, the commands retrieved in step 901 include a series of multiple write commands that spans a specific LBA range associated with at least one SMR band of user area 310, where the series of multiple write commands includes two or more non-sequential write commands. As non-sequential write commands, the series of multiple write commands specifies a first range of contiguous LBAs within the specific LBA range and a second range of contiguous LBAs within the specific LBA range that is not contiguous with the first range of contiguous LBAs. Thus, the commands retrieved in step 901 determine the specific LBA range over which disk access commands are performed via skip-bypass mode. In some embodiments, the LBA range over which disk access commands are to be performed via skip-bypass mode spans most or all of the disk access commands currently in command queue 152. In other embodiments, the LBA range over which some disk access commands are performed via skip-bypass mode may extend beyond the range of the disk access commands currently in the command queue. It is noted that during execution of method 900, additional disk access commands can oftentimes be received from a host by HDD 100, and generally such disk access commands are not included in the LBA range determined in step 902.

In step 902, the controller determines an LBA range over which disk access commands in command queue 152 are performed via an iteration of a skip-bypass operation. In some embodiments, the LBA range determined in step 902 spans only a portion of the LBA range determined in step 902. Thus, in such embodiments, multiple iterations of the skip-bypass operation are performed to complete storage in user area 310 of data associated with the disk access commands. Alternatively or additionally, in some embodiments, the LBA range determined in step 902 spans only a portion of the disk access commands currently in command queue 152. Thus, in such embodiments, multiple iterations of the skip-bypass operation are performed to complete storage in user area 310 of data associated with the disk access commands currently in command queue 152. In some embodiments, the LBA range determined in step 902 may correspond to a data storage capacity of read/write area 160. In some embodiments, the LBA range determined in step 902 spans only a portion of an SMR band, as shown, for example, in FIGS. 7B and 7C. Alternatively, in some embodiments, the LBA range determined in step 902 spans a complete SMR band or more than one SMR band.

In step 903, the controller performs a sequential read associated with the current iteration of the skip-bypass operation. Specifically, the controller causes HDD 100 to read data from an SMR band in user area 310 in a single sequential read operation and stores the read data in read/write area 160. In some cases, it may be necessary to read some data from an SMR band in user area 310 and some data from media-cache region 320. In step 903, HDD 100 reads some or all of the data from the LBA range determined in step 903, which is associated with a portion of the disk access commands currently in command queue 152. Thus, in step 903, HDD 100 reads the data from an LBA range that includes LBA ranges referenced by two or more of the non-sequential write commands in command queue 152. In many instances, HDD 100 reads the data from an LBA range that includes a relatively large number of LBA ranges that are each referenced by a different non-sequential write command in command queue 152. It is noted that, for some or all of these non-sequential write commands, the associated LBA range is separated from the LBA range associated with other non-sequential write commands. For example, as shown in FIG. 6, first LBA range 621 (associated with first write command 602A) is separated from second LBA range 622 (associated with second write command 602B) by LBA range gap 607. In step 903, HDD 100 reads data currently stored in an SMR band that corresponds to the LBA ranges that are not associated with write commands in command queue 152, such as LBA range gap 607. It is noted that, in some embodiments, HDD 100 may sequentially read all of the data in the selected region, including some data that will be obsoleted by write commands from the host, already received by the drive, or to be received in the near future. For example, in such embodiments, HDD 100 may read data from most or all of second SMR band 620, including the LBA ranges associated with write commands 602, even though the write data associated with write commands 602 will invalidate portions of such read data.

Alternatively, in some embodiments, HDD 100 performs the sequential read operation in step 903 under certain conditions and skips the sequential read operation under other conditions. In such embodiments, HDD 100 performs the sequential read operation in step 903 depending on certain data not being currently stored in read/write area 160 or elsewhere in RAM 134. In such embodiments, in step 903, the controller first determines whether there is valid data stored in read/write area 160 for the LBAs separating the non-sequential write commands in the LBA range determined in step 902. If yes, the controller does not perform a sequential read operation, since the latest version of data associated the LBAs separating the non-sequential write commands is already available in read/write area 160; if no, the controller performs the sequential read operation as described above. It is noted that a host usage pattern oftentimes occurring in RAID system can result in valid data being stored in read/write area 160 for the LBAs separating the non-sequential write commands in the LBA range determined in step 902. Thus, in such situations, the controller does not perform the above-described sequential read operation in step 903.

In step 904, the controller merges data associated with certain write commands in command queue 152 with data associated with LBA ranges that separate the write commands (such as LBA range gap 607). Specifically, the write commands are those write commands referencing LBAs that are included in the LBA range determined in step 902. In some embodiments, the controller merges these two types of data by determining a write order for the merged data. In such embodiments, the write order can be implemented via linked lists and/or any other suitable data structures that store a collection of data elements dynamically.

In step 905, the controller causes HDD 100 to rewrite the merged data to another SMR band in a single sequential write operation. For example, as shown in FIGS. 7E and 7G, HDD 100 rewrites the merged data to spare SMR band 713. In some instances, HDD 100 rewrites the merged data to an initial portion of spare SMR band 713 (e.g., first portion 731) in the single sequential write operation. In other instances, HDD 100 rewrites the merged data to a final or middle portion of spare SMR band 713 (e.g., second portion 732) in the single sequential write operation, such as when writing of data to SMR band 713 has been performed previously in skip-bypass mode and SMR band 713 is partially filled. In other instances, HDD 100 rewrites the merged data to a complete SMR band in the single sequential write operation.

In step 906, the controller determines whether there are any remaining portions of the LBA range retrieved in step 901 to be executed in skip-bypass mode. If yes, method 900 returns to step 902 and a further iteration of a skip-bypass operation is performed via steps 902-905; if no, method 900 proceeds to step 907.

In step 907, the controller determines whether HDD 100 is still to remain in skip-bypass mode, for example as determined via method 800 in FIG. 8. Thus, when the controller determines, based on an updated command history of HDD 100, that specified conditions are not met for HDD 100 to exit skip-bypass mode, method 900 returns to step 901 and a new LBA range performing skip-bypass mode is determined. Conversely, when the controller determines, based on the updated command history of HDD 100, that specified conditions are met for HDD 100 to exit skip-bypass mode, method 900 proceeds to step 908 and the controller switches operation of HDD 100 out of skip-bypass mode and method 900 terminates.

In sum, implementation of one or more embodiments of method 900 enables the execution of a plurality of non-sequential write commands that span an LBA range in an SMR HDD as a single sequential write command, or as a single sequential read command and a single sequential write command. In the embodiments, executing the plurality of non-sequential write commands as a single sequential read command and a single sequential write command avoids the latency and write amplification associated with prior art approaches for storing a plurality of non-sequential write commands.

While the foregoing is directed to embodiments of the present invention, other and further embodiments of the invention may be devised without departing from the basic scope thereof, and the scope thereof is determined by the claims that follow.

I claim:

1. A method of storing data in a magnetic disk drive with a shingled magnetic recording region (SMR) that includes a plurality of SMR bands, the method comprising:
   determining that a series of multiple write commands spans a first logical block address (LBA) range associated with a first SMR band in the plurality of SMR bands, wherein the series of multiple write commands specifies a first range of contiguous LBAs and a second range of contiguous LBAs that is not contiguous with the first range of contiguous LBAs and includes first data associated with the first range of contiguous LBAs and second data associated with the second range of contiguous LBAs; and
   in response to said determining:
   reading third data associated with one or more LBAs that are in between the first range of contiguous LBAs and the second range of contiguous LBAs; and
   writing, via a single sequential write operation performed on a second SMR band in the plurality of SMR bands, the first data associated with the first range of contiguous LBAs, then the third data that was read in response to said determining and is associated with said one or more LBAs, and then the second data associated with the second range of contiguous LBAs.

2. The method of claim 1, wherein the series of multiple write commands includes a number of non-sequential write commands that exceeds a threshold number.

3. The method of claim 2, wherein the threshold number comprises one of a fixed number of discrete write commands or a variable number of discrete write commands that varies based on one or more factors associated with operation of the magnetic disk drive.

4. The method of claim 3, wherein the one or more factors associated with operation of the magnetic disk drive include a size of available storage space in a media cache of the magnetic disk drive and available memory in a random-access memory of the magnetic disk drive.

5. The method of claim 1, wherein the series of multiple write commands references a span of LBAs that exceeds a threshold number of LBAs.

6. The method of claim 5, wherein the threshold number of LBAs corresponds to one of a specific fraction of a number of LBAs associated with an SMR band in the plurality of SMR bands or a number of LBAs associated with a specific number of SMR bands in the plurality of SMR bands.

7. The method of claim 1, wherein the series of multiple write commands includes a first LBA of an SMR band in the plurality of SMR bands.

8. The method of claim 1, further comprising, prior to said determining, receiving the series of multiple write commands from a host.

9. The method of claim 8, further comprising, prior to said determining, receiving one or more read commands from the host.

10. The method of claim 9, wherein the one or more read commands are associated with at least one LBA included in one of the first LBA range or the second LBA range.

11. The method of claim 1, further comprising, prior to reading the third data associated with said one or more LBAs, determining that the series of multiple write commands matches a specific pattern of host access commands.

12. The method of claim 11, wherein the reading of the third data associated with said one or more LBAs is further in response to determining that the series of multiple write commands matches the specific pattern of host access.

13. The method of claim 11, wherein the specific pattern of host access commands includes one of a series of disk access commands that reference progressively lower or progressively higher LBAs or a series of disk access commands that reference LBA ranges that progress through a specified number of logically adjacent SMR bands in the plurality of SMR bands.

14. The method of claim 1, further comprising, prior to reading the third data associated with said one or more LBAs, determining that a set of previously executed disk access commands matches a specific pattern of host access.

15. The method of claim 14, wherein the reading of the third data associated with said one or more LBAs is further in response to determining that the set of previously executed disk access commands matches the specific pattern of host access.

16. The method of claim 14, wherein the specific pattern of host access commands includes one of a series of disk access commands that reference progressively lower or progressively higher LBAs or a series of disk access commands that reference LBA ranges that progress through a specified number of logically adjacent SMR bands in the plurality of SMR bands.

17. The method of claim 1, wherein reading the third data associated with said one or more LBAs comprises at least one of reading at least a portion of the third data in a single sequential read operation from a third SMR band in the plurality of SMR bands, reading at least a portion of the third data from a random-access memory of the magnetic disk drive, or reading at least a portion of the third data from a media cache of the magnetic disk drive.

18. A magnetic disk drive, comprising:
 a shingled magnetic recording region (SMR) that includes a plurality of SMR bands; and
 a controller configured to perform the steps of:
 determining that a series of multiple write commands spans a first logical block address (LBA) range associated with a first SMR band in the plurality of SMR bands, wherein the series of multiple write commands specifies a first range of contiguous LBAs and a second range of contiguous LBAs that is not contiguous with the first range of contiguous LBAs and includes first data associated with the first range of contiguous LBAs and second data associated with the second range of contiguous LBAs; and
 in response to said determining
 reading third data associated with one or more LBAs that are in between the first range of contiguous LBAs and the second range of contiguous LBAs; and
 writing, via a single sequential write operation performed on a second SMR band in the plurality of SMR bands, the first data associated with the first range of contiguous LBAs, then the third data that was read in response to said determining and is associated with said one or more LBAs, and then the second data associated with the second range of contiguous LBAs.

19. The magnetic disk drive of claim 18, wherein reading the third data associated with said one or more LBAs comprises at least one of reading at least a portion of the third data in a single sequential read operation from a third SMR band in the plurality of SMR bands, reading at least a portion of the third data from a random-access memory of the magnetic disk drive, or reading at least a portion of the third data from a media cache of the magnetic disk drive.

20. The magnetic disk drive of claim 18, wherein the series of multiple write commands includes a number of non-sequential write commands that exceeds a threshold number.

* * * * *